(12) United States Patent
Shirao et al.

(10) Patent No.: US 12,275,508 B2
(45) Date of Patent: Apr. 15, 2025

(54) WATERCRAFT CONTROL SYSTEM, WATERCRAFT CONTROL METHOD, PROGRAM, AND VEHICLE CONTROL SYSTEM

(71) Applicant: NHK SPRING Co., Ltd., Yokohama (JP)

(72) Inventors: Masato Shirao, Yokohama (JP); Marino Akita, Yokohama (JP); Takafumi Oshima, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 193 days.

(21) Appl. No.: 18/008,817

(22) PCT Filed: Jun. 8, 2021

(86) PCT No.: PCT/JP2021/021743
§ 371 (c)(1),
(2) Date: Dec. 7, 2022

(87) PCT Pub. No.: WO2021/251380
PCT Pub. Date: Dec. 16, 2021

(65) Prior Publication Data
US 2023/0227135 A1 Jul. 20, 2023

(30) Foreign Application Priority Data

Jun. 10, 2020 (JP) ................................. 2020-101114

(51) Int. Cl.
*B63C 9/00* (2006.01)
*B63H 21/21* (2006.01)
*G05D 1/00* (2006.01)

(52) U.S. Cl.
CPC ........... *B63C 9/0005* (2013.01); *B63H 21/21* (2013.01); *G05D 1/0206* (2013.01); *B63H 2021/216* (2013.01)

(58) Field of Classification Search
CPC ........ B63C 9/0005; B63C 9/20; B63H 21/21; B63H 2021/216; G05D 1/0206
See application file for complete search history.

(56) References Cited

U.S. PATENT DOCUMENTS 6,150,928 A 11/2000 Murray
6,222,484 B1 4/2001 Seiple et al.
(Continued)

FOREIGN PATENT DOCUMENTS

GB 2409778 A 7/2005
JP 2003127987 A 5/2003
(Continued)

OTHER PUBLICATIONS

EPO Extended European Search Report for corresponding EP Application No. 21820874.2; Issue Date, Nov. 7, 2023.
(Continued)

*Primary Examiner* — Michael V Kerrigan
(74) *Attorney, Agent, or Firm* — CANTOR COLBURN LLP

(57) ABSTRACT

A watercraft control system includes a watercraft and a communication device. The communication device includes a communication unit configured to transmit information indicating a location of the communication device to the watercraft. The watercraft includes a communication unit configured to receive the information indicating the location of the communication device and a difference calculation unit configured to calculate a difference between the location of the communication device and a location of the watercraft.

12 Claims, 10 Drawing Sheets

(56) References Cited

U.S. PATENT DOCUMENTS

| | | |
|---|---|---|
| 6,414,629 B1 | 7/2002 | Curcio |
| 2003/0089291 A1 | 5/2003 | Kanno et al. |
| 2005/0040987 A1 | 2/2005 | Bruno et al. |
| 2018/0335780 A1* | 11/2018 | Stevens ................. B63C 9/0011 |
| 2020/0043315 A1 | 2/2020 | Watanabe |

FOREIGN PATENT DOCUMENTS

| | | |
|---|---|---|
| JP | 2020019424 A | 2/2020 |
| KR | 1020200052535 A | 5/2020 |
| WO | 03018398 A1 | 3/2003 |

OTHER PUBLICATIONS

International Search Report for International Application No. PCT/JP2021/021743; Date of Mailing, Aug. 17, 2021.

\* cited by examiner

FIG. 4A  IDENTICAL LOCATION TIME
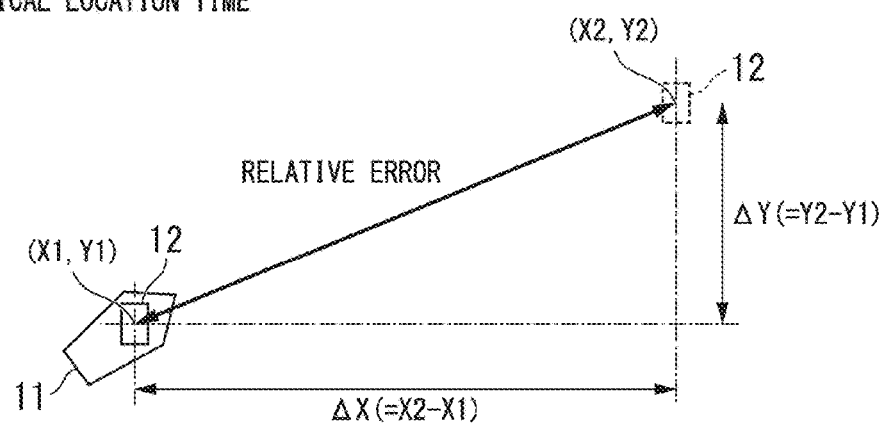
FIG. 4B  SEPARATION TIME
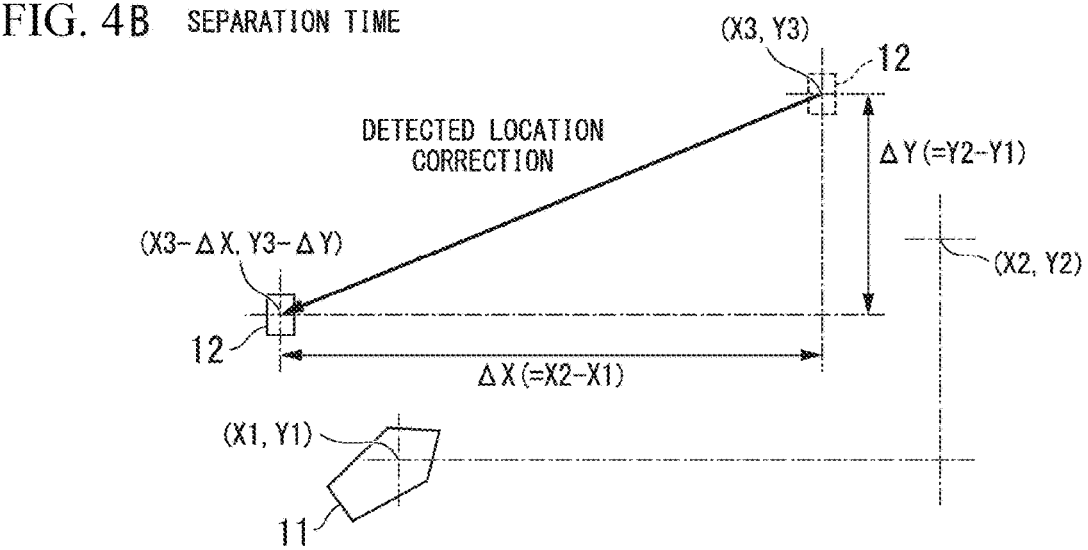

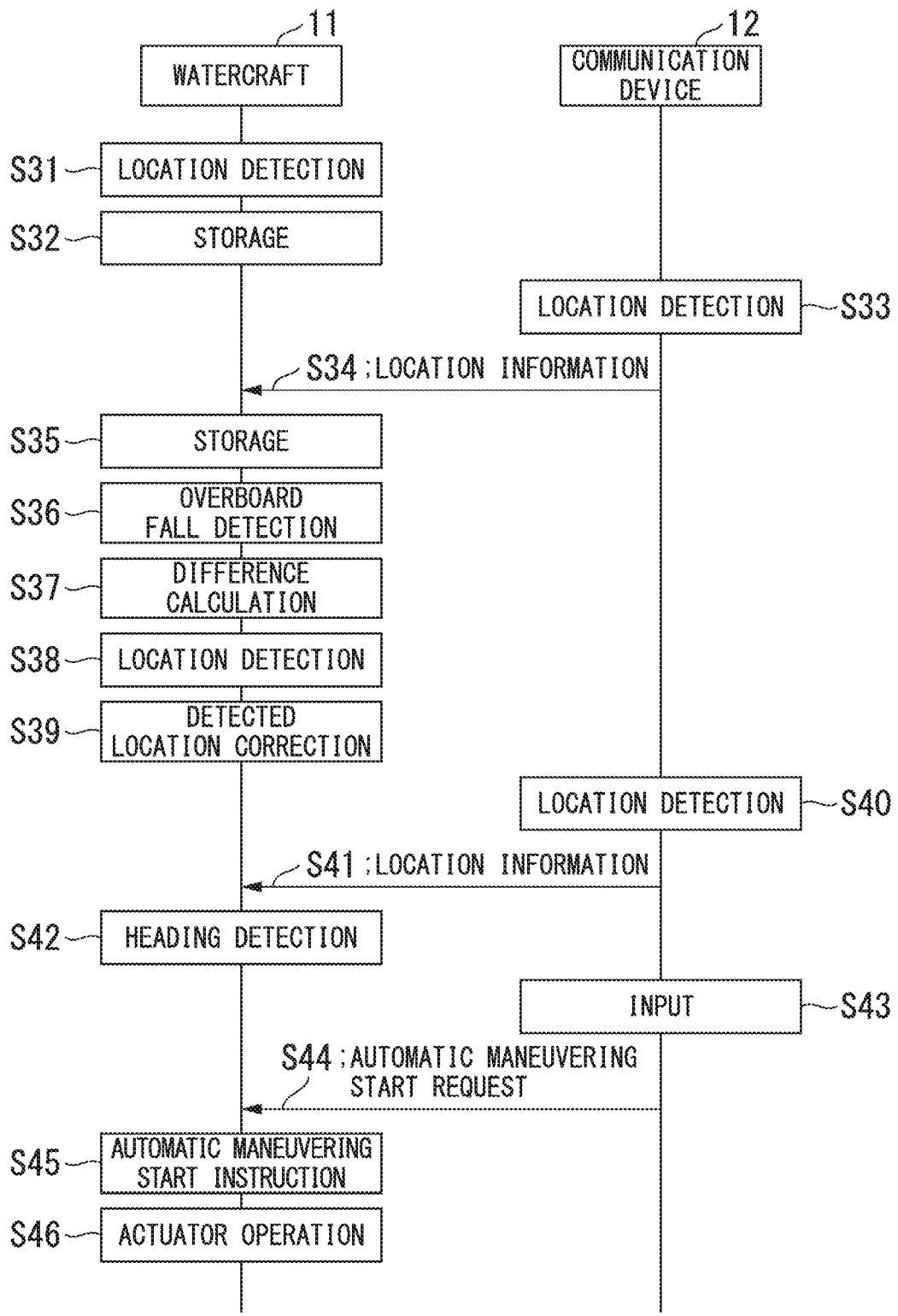

FIG. 7A IDENTICAL LOCATION TIME
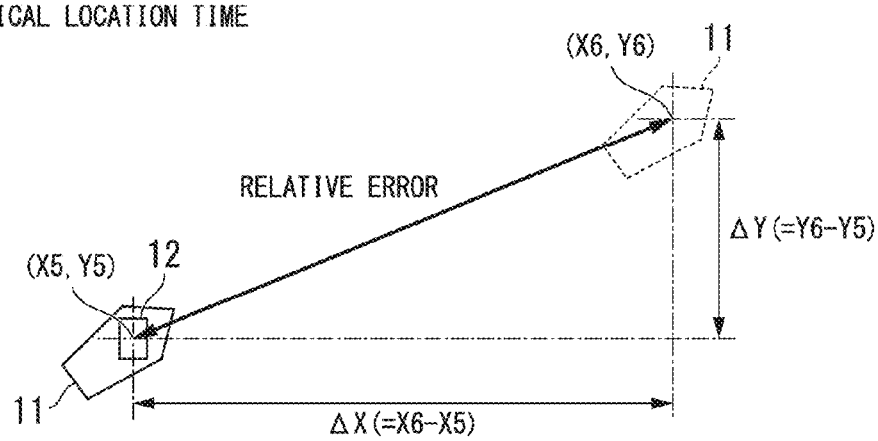
FIG. 7B SEPARATION TIME
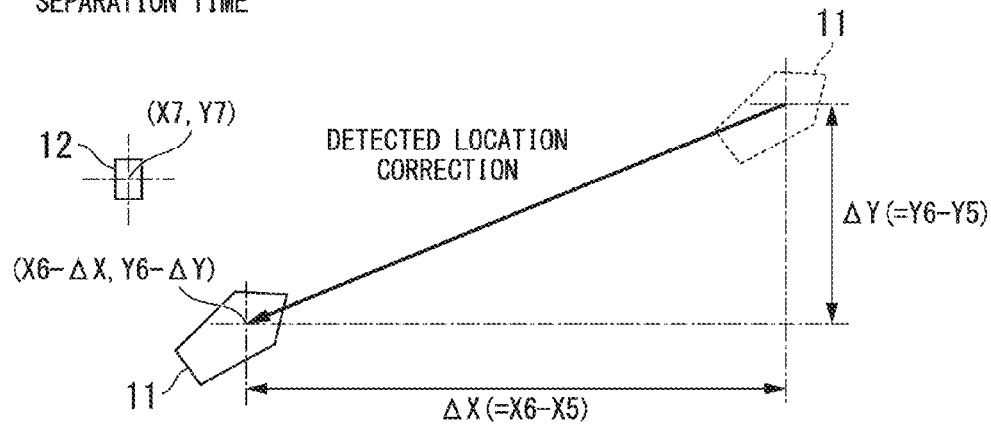

WATERCRAFT CONTROL SYSTEM, WATERCRAFT CONTROL METHOD, PROGRAM, AND VEHICLE CONTROL SYSTEM

CROSS REFERENCE TO RELATED APPLICATIONS

This is the U.S. national stage of application No. PCT/JP2021/021743, filed on Jun. 8, 2021. Priority under 35 U.S.C. § 119(a) and 35 U.S.C. § 365(b) is claimed from Japanese Application No. 2020-101114, filed Jun. 10, 2020, the disclosure of which is also incorporated herein by reference.

TECHNICAL FIELD

The present invention relates to a watercraft control system, a watercraft control method, a program, and a vehicle control system.

BACKGROUND ART

In the related art, a personal watercraft (PWC) auto-return system is known (see, for example, Patent Document 1). The PWC auto-return system described in Patent Document 1 includes a user device and an automatic maneuvering unit arranged within a PWC. The user device includes a rider location determination unit, a user interface, and a communication unit. In the technology described in Patent Document 1, when a rider carrying the user device is away from the PWC (falls overboard), the PWC receives a request from the user interface and moves to a location of the user device in an automatic maneuvering process.

Meanwhile, as described in Patent Document 1, for example, the location of the PWC is detected using the Global Positioning System (GPS) or the like and the location of the user device is also detected in a method similar to the PWC location detection method.

Meanwhile, for example, when the location of the PWC is detected using the GPS, the detected location of the PWC includes an error. Likewise, for example, when the location of the user device is detected using the GPS, the detected location of the user device includes an error. As a result, relative locations of the PWC and the user device obtained using the GPS include a significantly large error.

That is, in the technology described in Patent Document 1, because the PWC is moved to the location of the user device (automatically maneuvered) on the basis of the relative locations of the PWC and the user device including a significantly large error, the PWC may be inappropriately moved.

CITATION LIST

Patent Document

Patent Document 1
United States Patent Application, Publication No. 2018/0335780

SUMMARY OF INVENTION

Technical Problem

In view of the above-described problems, an objective of the present invention is to provide a watercraft control system, a watercraft control method, and a program capable of utilizing information of a location of a communication device detected by a communication device location detection unit and information of a location of a watercraft detected by a watercraft location detection unit even if the location of the communication device detected by the communication device location detection unit is not identical to the location of the watercraft detected by the watercraft location detection unit when the locations should be identical to each other.

Also, an objective of the present invention is to provide a vehicle control system capable of utilizing information of a location of a communication device detected by a communication device location detection unit and information of a location of a vehicle detected by a vehicle location detection unit even if the location of the communication device detected by the communication device location detection unit is not identical to the location of the vehicle detected by the vehicle location detection unit when the locations should be identical to each other.

Solution to Problem

According to an aspect of the present invention, there is provided a watercraft control system including a watercraft and a communication device, wherein the communication device includes a communication device location detection unit configured to detect a location of the communication device; and a first communication unit, wherein the watercraft includes a watercraft location detection unit configured to detect a location of the watercraft; a second communication unit; and the location of the communication device detected by the communication device location detection unit, and wherein at least one of the watercraft and the communication device includes a difference calculation unit configured to calculate a difference between the location of the communication device detected by the communication device location detection unit and the location of the watercraft detected by the watercraft location detection unit.

According to an aspect of the present invention, there is provided a watercraft control method for use in a watercraft control system including a watercraft and a communication device, the watercraft control method including: a communication device location detection step of detecting a location of the communication device; a watercraft location detection step of detecting a location of the watercraft; and a difference calculation step of calculating a difference between the location of the communication device detected in the communication device location detection step and the location of the watercraft detected in the watercraft location detection step.

According to an aspect of the present invention, there is provided a program for causing a computer mounted in a watercraft to execute a watercraft location detection step of detecting a location of the watercraft, a reception step of receiving information indicating a location of a communication device, and a difference calculation step of calculating a difference between the location of the communication device and the location of the watercraft detected in the watercraft location detection step, wherein the communication device includes a communication device location detection unit configured to detect the location of the communication device; and a communication unit configured to transmit the information indicating the location of the communication device detected by the communication device location detection unit to the watercraft.

According to an aspect of the present invention, there is provided a vehicle control system including a vehicle and a communication device, wherein the communication device includes a communication device location detection unit configured to detect a location of the communication device; and a first communication unit, wherein the vehicle includes a vehicle location detection unit configured to detect a location of the vehicle; a second communication unit; and the location of the communication device detected by the communication device location detection unit, and wherein at least one of the vehicle and the communication device includes a difference calculation unit configured to calculate a difference between the location of the communication device detected by the communication device location detection unit and the location of the vehicle detected by the vehicle location detection unit.

Advantageous Effects of Invention

According to the present invention, it is possible to provide a watercraft control system, a watercraft control method, and a program capable of utilizing information of a location of a communication device detected by a communication device location detection unit and information of a location of a watercraft detected by a watercraft location detection unit even if the location of the communication device detected by the communication device location detection unit is not identical to the location of the watercraft detected by the watercraft location detection unit when the locations should be identical to each other.

Also, according to the present invention, it is possible to provide a vehicle control system capable of utilizing information of a location of a communication device detected by a communication device location detection unit and information of a location of a vehicle detected by a vehicle location detection unit even if the location of the communication device detected by the communication device location detection unit is not identical to the location of the vehicle detected by the vehicle location detection unit when the locations should be identical to each other.

BRIEF DESCRIPTION OF DRAWINGS

FIG. 4A and FIG. 4B is a diagram showing an example of a relationship between a watercraft and a communication device during the execution of the process shown in FIG. 2.

FIG. 5 is a sequence diagram for describing an example of a process executed in a watercraft control system of a second embodiment.

FIG. 7A and FIG. 7B is a diagram showing an example of a relationship between a watercraft and a communication device during the execution of the process shown in FIG. 5.

DESCRIPTION OF EMBODIMENTS

First Embodiment

A first embodiment of a watercraft control system, a watercraft control method, and a program according to the present invention will be described below.

Figure 1:
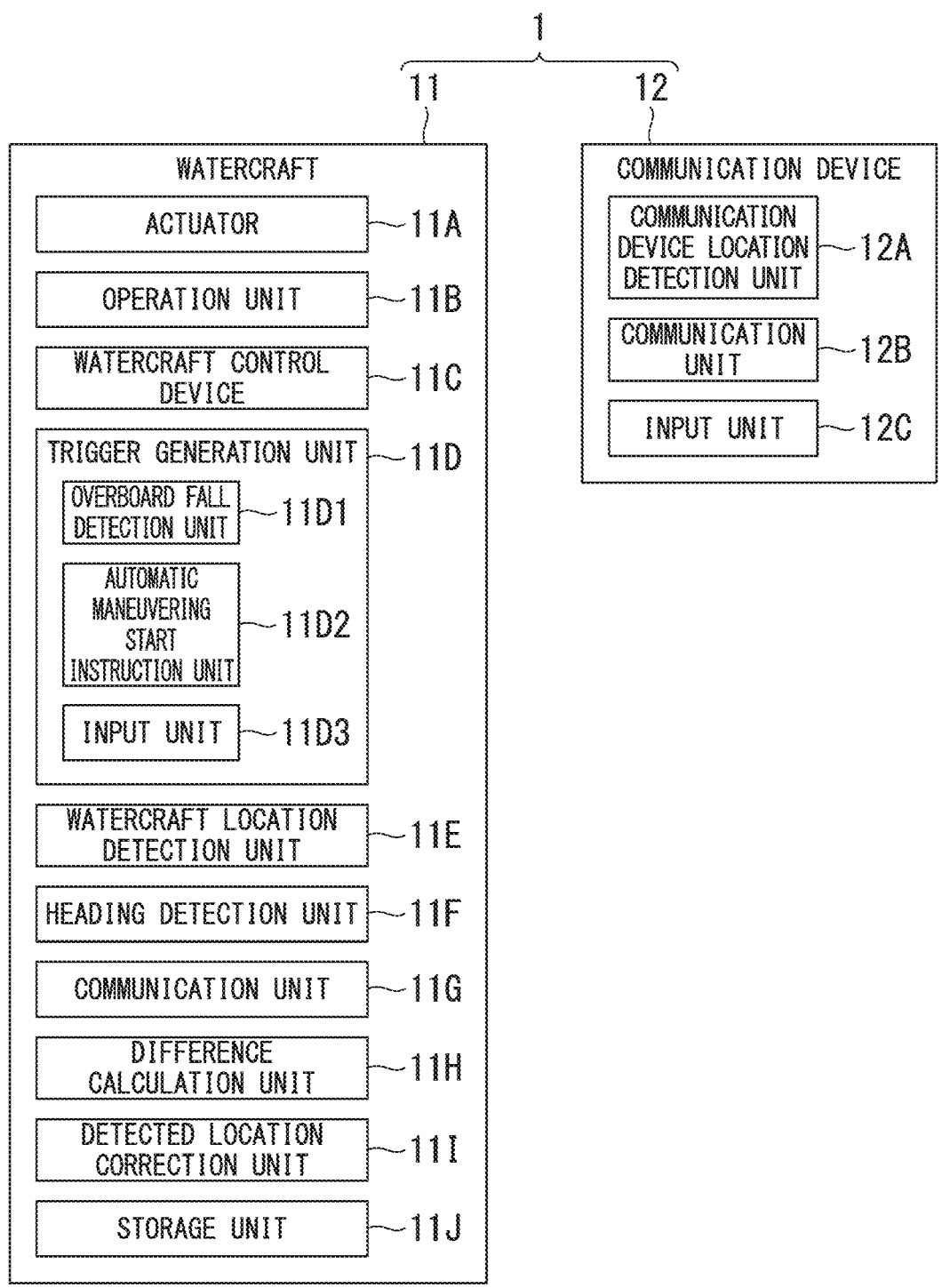
FIG. 1 is a diagram schematically showing an example of a watercraft control system of a first embodiment.

FIG. 1 is a diagram schematically showing an example of a watercraft control system 1 of the first embodiment.

In the example shown in FIG. 1, the watercraft control system 1 includes a watercraft 11 and a communication device 12.

The watercraft 11 of the first embodiment is, for example, a personal watercraft (PWC) (a water-motorcycle) having functions similar to those of the PWC described in FIG. 1 of Japanese Patent No. 5196649. The watercraft 11 includes an actuator 11A, an operation unit 11B, a watercraft control device 11C, a trigger generation unit 11D, a watercraft location detection unit 11E, a heading detection unit 11F, a communication unit 11G, a difference calculation unit 11H, a detected location correction unit 11I, and a storage unit 11J.

The actuator 11A has a function of generating a propulsive force for the watercraft 11 and a function of generating a turning moment in the watercraft 11. The actuator 11A includes, for example, the engine, the nozzle, the deflector, the trim actuator, the bucket, the bucket actuator, and the like described in FIG. 1 of Japanese Unexamined Patent Application, First Publication No. 2019-171925.

The operation unit 11B receives an input operation by the watercraft operator who operates the actuator 11A. The operation unit 11B is configured like, for example, the steering handle device described in FIG. 1 of Japanese Patent No. 5196649, the steering unit described in FIG. 1 of Japanese Unexamined Patent Application, First Publication No. 2019-171925, or the like.

The watercraft control device 11C performs a control process of operating the actuator 11A on the basis of the input operation of the watercraft operator received by the operation unit 11B and the like. The watercraft control device 11C has a manual maneuvering mode in which the actuator 11A is operated on the basis of the input operation of the watercraft operator received by the operation unit 11B and an automatic maneuvering mode in which the actuator 11A is operated on the basis of relative locations of the watercraft 11 and the communication device 12 and heading of the watercraft 11 without any need for the operation unit 11B to receive the input operation.

The trigger generation unit 11D generates a trigger for switching the mode of the watercraft control device 11C from the manual maneuvering mode to the automatic maneuvering mode. The trigger generation unit 11D includes an overboard fall detection unit 11D1, an automatic maneuvering start instruction unit 11D2, and an input unit 11D3.

The overboard fall detection unit 11D1 detects the falling of an occupant of the watercraft 11 (for example, a watercraft operator, an occupant other than the watercraft operator, or the like) overboard. The overboard fall detection unit 11D1 of the first embodiment is configured like, for example, the lanyard cord and the switch described in paragraph 0002 of Japanese Patent No. 4205261. Specifically, one end of the lanyard cord is connected to an overboard fall detection target person (for example, the watercraft operator, the occupant other than the watercraft operator, or the like). The other end of the lanyard cord is connected to a switch (not shown) arranged within the watercraft 11.

When the detection target person falls overboard from the watercraft 11, the other end of the lanyard cord is disconnected from the switch and the switch detects the falling of the detection target person overboard. As a result, the trigger generation unit 11D generates a trigger and the watercraft control device 11C switches the mode from the manual maneuvering mode to the automatic maneuvering mode.

The automatic maneuvering start instruction unit 11D2 outputs an automatic maneuvering start instruction on the basis of an automatic maneuvering start request transmitted from the communication device 12 (the "automatic maneuvering start request" will be described below).

When the automatic maneuvering start instruction unit 11D2 outputs the automatic maneuvering start instruction, the watercraft control device 11C starts a control process of operating the actuator 11A (a process of controlling the automatic maneuvering mode) without any need for the operation unit 11B to receive an input operation. The watercraft control device 11C controls the actuator 11A on the basis of relative locations of the watercraft 11 and the communication device 12 and heading of the watercraft 11 in the automatic maneuvering mode.

In another example, the trigger generation unit 11D may not include the automatic maneuvering start instruction unit 11D2. In the present example, when the overboard fall detection unit 11D1 detects the falling of an occupant of the watercraft 11 overboard, the trigger generation unit 11D generates a trigger and the watercraft control device 11C switches the mode from the manual maneuvering mode to the automatic maneuvering mode and also starts the control of the automatic maneuvering mode.

In the example shown in FIG. 1, the input unit 11D3 receives, for example, the automatic maneuvering start request from the watercraft operator of the watercraft 11 (for example, the automatic maneuvering start request from the watercraft operator who is about to disembark from the watercraft 11 while carrying the communication device 12).

The automatic maneuvering start instruction unit 11D2 also outputs an automatic maneuvering start instruction even if the input unit 11D3 receives the automatic maneuvering start request. When the automatic maneuvering start instruction unit 11D2 outputs the automatic maneuvering start instruction, the watercraft control device 11C starts a control process of operating the actuator 11A (a process of controlling the automatic maneuvering mode) without any need for the operation unit 11B to receive an input operation. In the automatic maneuvering mode, the watercraft control device 11C controls the actuator 11A on the basis of the relative locations of the watercraft 11 and the communication device 12 (in detail, the communication device 12 carried by the watercraft operator who has disembarked from the watercraft 11) and heading of the watercraft 11.

In another example, the trigger generation unit 11D may not include the input unit 11D3.

In the examples shown in FIG. 1, the watercraft location detection unit 11E detects a location of the watercraft 11. The watercraft location detection unit 11E includes, for example, a Global Positioning System (GPS) device. The GPS device calculates location coordinates of the watercraft 11 by receiving signals from a plurality of GPS satellites. The location of the watercraft 11 detected by the watercraft location detection unit 11E is used for controlling the automatic maneuvering mode of the watercraft control device 11C described above.

The heading detection unit 11F detects the heading of the watercraft 11. The heading detection unit 11F includes, for example, a direction sensor. The direction sensor calculates the heading of the watercraft 11 using, for example, geomagnetism. The heading of the watercraft 11 detected by the heading detection unit 11F is used for controlling the automatic maneuvering mode of the watercraft control device 11C.

In another example, the direction sensor may be a device (a gyrocompass) in which a north-pointing device and a damping device are added to a gyroscope that rotates at a high speed so that north is indicated all the time.

In yet another example, the direction sensor may be a GPS compass that includes a plurality of GPS antennas and calculates the heading from a relative locational relationship of the plurality of GPS antennas.

In the examples shown in FIG. 1, the communication unit 11G communicates with the communication device 12.

The communication device 12 is carried by the above-described overboard fall detection target person (occupant). The communication device 12 includes a communication device location detection unit 12A, a communication unit 12B, and an input unit 12C.

The communication device location detection unit 12A detects the location of the communication device 12. The communication device location detection unit 12A includes, for example, a GPS device. The GPS device calculates location coordinates of the communication device 12 by receiving signals from a plurality of GPS satellites.

The input unit 12C receives, for example, the automatic maneuvering start request from the watercraft operator of the watercraft 11 (for example, the automatic maneuvering start request from the watercraft operator who has fallen overboard from the watercraft 11 while carrying the communication device 12).

The communication unit 12B transmits information indicating the location of the communication device 12 detected by the communication device location detection unit 12A to the watercraft 11. The communication unit 11G of the watercraft 11 receives the information indicating the location of the communication device 12 transmitted by the communication unit 12B. The location of the communication device 12 detected by the communication device location detection unit 12A is used for controlling the automatic maneuvering mode of the watercraft control device 11C.

Also, the communication unit 12B transmits the automatic maneuvering start request received by the input unit 12C to the watercraft 11. The communication unit 11G of the watercraft 11 receives the automatic maneuvering start request transmitted by the communication unit 12B. As described above, the automatic maneuvering start instruction unit 11D2 of the watercraft 11 outputs the automatic maneuvering start instruction on the basis of the automatic maneuvering start request transmitted from the communication device 12.

In another example, the communication device 12 may not include the input unit 12C. In the present example, the communication unit 12B does not transmit the automatic maneuvering start request to the watercraft 11 and the watercraft control device 11C starts the control of the automatic maneuvering mode on the basis of a trigger generated by the trigger generation unit 11D.

Although the trigger generation unit 11D of the watercraft 11 generates a trigger for switching the mode of the watercraft control device 11C from the manual maneuvering mode to the automatic maneuvering mode in the example shown in FIG. 1, a function of generating a trigger for switching the mode of the watercraft control device 11C from the manual maneuvering mode to the automatic maneuvering mode may be provided in the communication device 12 in another example.

For example, the location of the watercraft 11 detected by the watercraft location detection unit 11E using a GPS device includes an error. Also, for example, the location of the communication device 12 detected by the communication device location detection unit 12A using a GPS device also includes an error. Thus, the relative locations of the watercraft 11 and the communication device 12 may include a large error.

Therefore, in the example shown in FIG. 1, the watercraft 11 includes the difference calculation unit 11H and the detected location correction unit 11I, as described above.

The difference calculation unit 11H calculates a difference between the location of the communication device 12 detected by the communication device location detection unit 12A and the location of the watercraft 11 detected by the watercraft location detection unit 11E. In detail, the difference calculation unit 11H calculates a difference between an identical location time-specific communication device location that is a location of the communication device 12 detected by the communication device location detection unit 12A when an actual location of the watercraft 11 is identical to an actual location of the communication device 12 and an identical location time-specific watercraft location that is a location of the watercraft 11 detected by the watercraft location detection unit 11E when the actual location of the watercraft 11 is identical to the actual location of the communication device 12 (for example, when no overboard fall has occurred, immediately after an overboard fall, or the like).

For example, the difference calculation unit 11H calculates a difference between a non-overboard-fall time-specific communication device location that is a location of the communication device 12 detected by the communication device location detection unit 12A when the overboard fall detection unit 11D1 has not detected the falling of the occupant of the watercraft 11 overboard and a non-overboard-fall time-specific watercraft location that is a location of the watercraft 11 detected by the watercraft location detection unit 11E when the overboard fall detection unit 11D1 has not detected the falling of the occupant of the watercraft 11 overboard.

When the occupant has not fallen overboard, the occupant is located on the watercraft 11, and therefore the location of the communication device 12 carried by the occupant is identical to the location of the watercraft 11. Thus, when the location of the communication device 12 detected by the communication device location detection unit 12A does not include an error and the location of the watercraft 11 detected by the watercraft location detection unit 11E does not include an error, a difference between the location of the communication device 12 detected by the communication device location detection unit 12A and the location of the watercraft 11 detected by the watercraft location detection unit 11E becomes zero when the occupant has not fallen overboard.

In the example shown in FIG. 1, using this fact, the detected location correction unit 11I corrects the location of the communication device 12 detected by the communication device location detection unit 12A.

In detail, the detected location correction unit 11I corrects the location of the communication device 12 detected by the communication device location detection unit 12A on the basis of a difference between an identical location time-specific communication device location (for example, a non-overboard-fall time-specific communication device location) and an identical location time-specific watercraft location (for example, a non-overboard-fall time-specific watercraft location). Specifically, when a difference between the identical location time-specific communication device location (for example, the non-overboard-fall time-specific communication device location) and the identical location time-specific watercraft location (for example, the non-overboard-fall time-specific watercraft location) does not become zero, the detected location correction unit 11I offsets (corrects) the location of the communication device 12 detected by the communication device location detection unit 12A so that the difference between the identical location time-specific communication device location (for example, the non-overboard-fall time-specific communication device location) and the identical location time-specific watercraft location (for example, the non-overboard-fall time-specific watercraft location) becomes zero.

The storage unit 11J stores the location of the communication device 12 detected by the communication device location detection unit 12A and the location of the watercraft 11 detected by the watercraft location detection unit 11E.

In detail, the storage unit 11J stores the identical location time-specific communication device location and the identical location time-specific watercraft location. For example, the storage unit 11J stores the location of the communication device 12 detected by the communication device location detection unit 12A when the overboard fall detection unit 11D1 has not detected the falling of the occupant of the watercraft 11 overboard (the non-overboard-fall time-specific communication device location) and the location of the watercraft 11 detected by the watercraft location detection unit 11E when the overboard fall detection unit 11D1 has not detected the falling of the occupant of the watercraft 11 overboard (the non-overboard-fall time-specific watercraft location).

For example, when the overboard fall detection unit 11D1 detects that an occupant of the watercraft 11 has fallen overboard, the difference calculation unit 11H calculates the difference between the identical location time-specific communication device location and the identical location time-specific watercraft location stored in the storage unit 11J. For example, the difference calculation unit 11H calculates a difference between the non-overboard-fall time-specific communication device location (for example, the location of the communication device detected by the communication device location detection unit 12A immediately before the overboard fall) stored in the storage unit 11J and the non-overboard-fall time-specific watercraft location (for example, the location of the watercraft 11 detected by the watercraft location detection unit 11E immediately before the overboard fall) stored in the storage unit 11J.

The detected location correction unit 11I corrects the location of the communication device 12 detected by the communication device location detection unit 12A after the overboard fall detection unit 11D1 detects the falling of the occupant of the watercraft 11 overboard on the basis of the difference between the identical location time-specific communication device location and the identical location time-specific watercraft location stored in the storage unit 11J (for example, the difference between the non-overboard-fall time-specific communication device location stored in the storage unit 11J and the non-overboard-fall time-specific watercraft location stored in the storage unit 11J).

Figure 2:
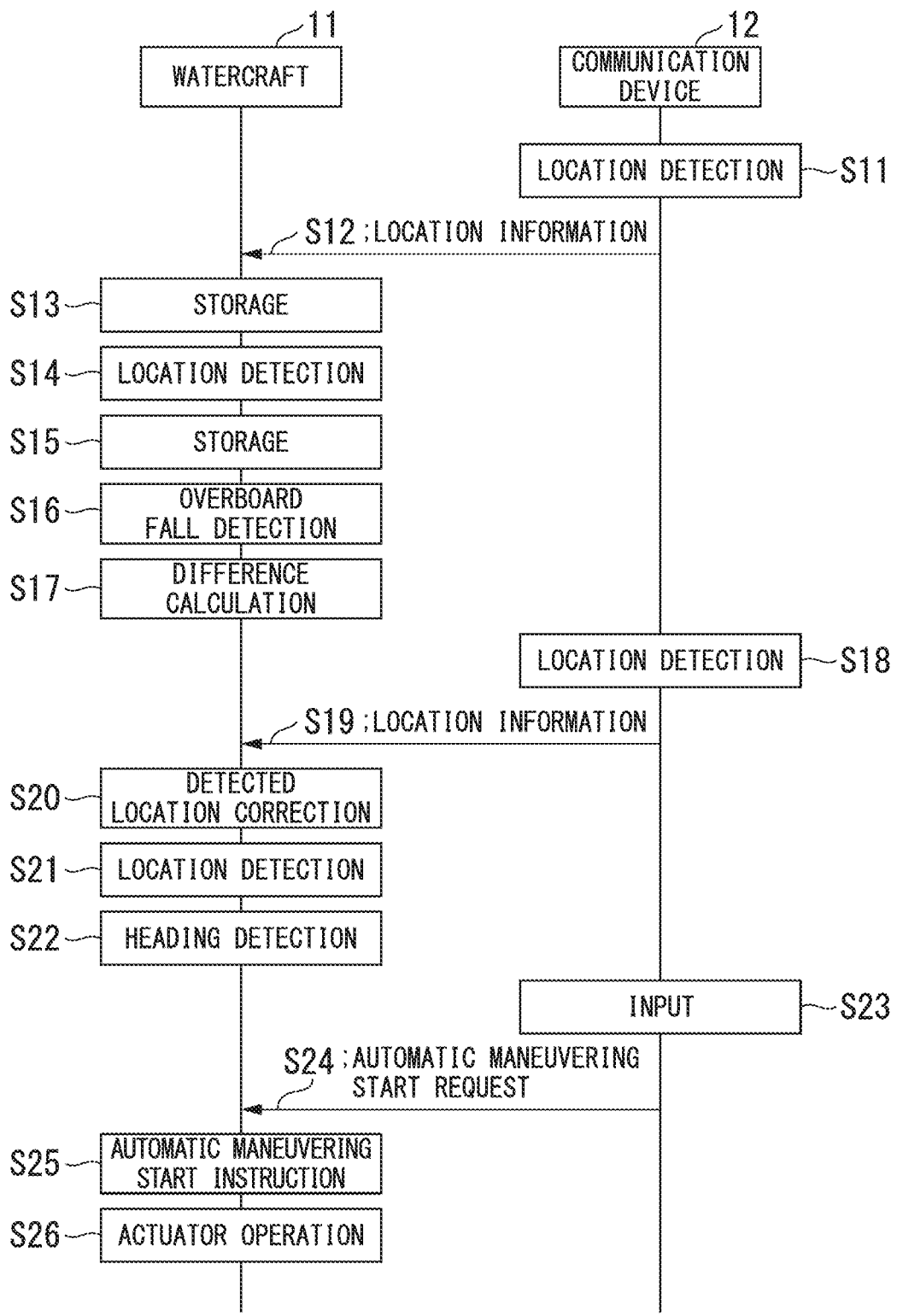
FIG. 2 is a sequence diagram for describing an example of a process executed in the watercraft control system of the first embodiment.

FIG. 2 is a sequence diagram for describing an example of a process executed in the watercraft control system 1 of the first embodiment. FIG. 4A and FIG. 4B is a diagram showing an example of a relationship between the watercraft 11 and the communication device 12 during the execution of the process shown in FIG. 2.

In the examples shown in FIGS. 2, FIG. 4A, and FIG. 4B, in step S11, the communication device location detection unit 12A of the communication device 12 detects a location (X2, Y2) of the communication device 12 (see FIG. 4A).

Subsequently, in step S12, the communication unit 12B of the communication device 12 transmits information indicating the location (X2, Y2) of the communication device 12 detected in step S11 and the communication unit 11G of the watercraft 11 receives the information.

Subsequently, in step S13, the storage unit 11J of the watercraft 11 stores the location (X2, Y2) of the communication device 12 detected in step S11.

Also, in step S14, the watercraft location detection unit 11E of the watercraft 11 detects the location (X1, Y1) of the watercraft 11 (see FIG. 4A).

Subsequently, in step S15, the storage unit 11J of the watercraft 11 stores the location (X1, Y1) of the watercraft 11 detected in step S14.

Subsequently, in step S16, the overboard fall detection unit 11D1 of the watercraft 11 detects the falling of the occupant of the watercraft 11 overboard.

That is, in a step before step S16, the actual location of the communication device 12 is identical to the actual location of the watercraft 11, the location of the communication device 12 detected in step S11 is the identical location time-specific communication device location, and the location of the watercraft 11 detected in step S14 is the identical location time-specific watercraft location. On the other hand, the location (X2, Y2) of the communication device 12 detected in step S11 and the location (X1, Y1) of the watercraft 11 detected in step S14 have a relative error ($\Delta X(=X2-X1)$, $\Delta Y(=Y2-Y1)$) and the location (X2, Y2) of the communication device 12 detected in step S11 may not be identical to the location (X1, Y1) of the watercraft 11 detected in step S14.

Thus, subsequently, in step S17, the difference calculation unit 11H of the watercraft 11 calculates a difference ($\Delta X(=X2-X1)$, $\Delta Y(=Y2-Y1)$) between the location (X2, Y2) of the communication device 12 stored in step S13 (i.e., the location of the communication device 12 detected in step S11 before the overboard fall) and the location (X1, Y1) of the watercraft 11 stored in step S15 (i.e., the location of the watercraft 11 detected in step S14 before the overboard fall) (i.e., a difference between the identical location time-specific communication device location and the identical location time-specific watercraft location).

Also, in step S18, the communication device location detection unit 12A of the communication device 12 detects a location (X3, Y3) of the communication device 12 (see FIG. 4(B)). That is, the communication device location detection unit 12A detects the location (X3, Y3) of the communication device 12 after the overboard fall (i.e., a location of the communication device 12 when the watercraft 11 and the communication device 12 are away from each other).

Subsequently, in step S19, the communication unit 12B of the communication device 12 transmits information indicating the location (X3, Y3) of the communication device 12 detected in step S18 and the communication unit 11G of the watercraft 11 receives the information.

Subsequently, in step S20, the detected location correction unit 11I of the watercraft 11 corrects the location (X3, Y3) of the communication device 12 detected in step S18.

In detail, the detected location correction unit 11I corrects the location (X3, Y3) of the communication device 12 detected in step S18 on the basis of the difference ($\Delta X(=X2-X1)$, $\Delta Y(=Y2-Y1)$) between the non-overboard-fall time-specific communication device location (X2, Y2) and the non-overboard-fall time-specific watercraft location (X1, Y1) and calculates the corrected location ($X3-\Delta X$, $Y3-\Delta Y$) of the communication device 12 (see FIG. 4(B)).

Also, in step S21, the watercraft location detection unit 11E of the watercraft 11 detects the location (X1, Y1) of the watercraft 11 (see FIG. 4B). That is, the watercraft location detection unit 11E detects the location (X1, Y1) of the watercraft 11 after the overboard fall.

Also, in step S22, the heading detection unit 11F of the watercraft 11 detects the heading of the watercraft 11.

Also, in step S23, the input unit 12C of the communication device 12 receives an automatic maneuvering start request from a watercraft operator who has fallen overboard from the watercraft 11 while carrying the communication device 12.

Subsequently, in step S24, the communication unit 12B of the communication device 12 transmits the automatic maneuvering start request received in step S23 and the communication unit 11G of the watercraft 11 receives the automatic maneuvering start request.

Subsequently, in step S25, the automatic maneuvering start instruction unit 11D2 of the watercraft 11 outputs an automatic maneuvering start instruction on the basis of the automatic maneuvering start request.

Subsequently, in step S26, the watercraft control device 11C of the watercraft 11 operates the actuator 11A on the basis of relative locations of the watercraft 11 and the communication device 12 and the heading of the watercraft 11 and starts the control of the automatic maneuvering mode. That is, the watercraft control device 11C operates the actuator 11A on the basis of the location ($X3-\Delta X$, $Y3-\Delta Y$) of the communication device 12 after the correction process of the detected location correction unit 11I is performed (see FIG. 4B), the location (X1, Y1) of the watercraft 11 (see FIG. 4B), and the heading of the watercraft 11.

In detail, the watercraft control device 11C operates the actuator 11A so that a distance between the location ($X3-\Delta X$, $Y3-\Delta Y$) of the communication device 12 after the correction process of the detected location correction unit 11I is performed and the location (X1, Y1) of the watercraft 11 is less than that when the overboard fall detection unit 11D1 has detected the falling of the occupant of the watercraft 11 overboard. As a result, the watercraft 11 is automatically maneuvered to approach the watercraft operator who has fallen overboard from the watercraft 11 while carrying the communication device 12.

For example, the watercraft control device 11C executes a control process of decreasing an angle difference between a heading angle of the watercraft 11 and an azimuth angle of the communication device 12 in the watercraft 11 and decreasing a distance between the location of the communication device 12 after the correction process of the detected location correction unit 11I is performed and the location of the watercraft 11 in the automatic maneuvering mode.

Figure 3:
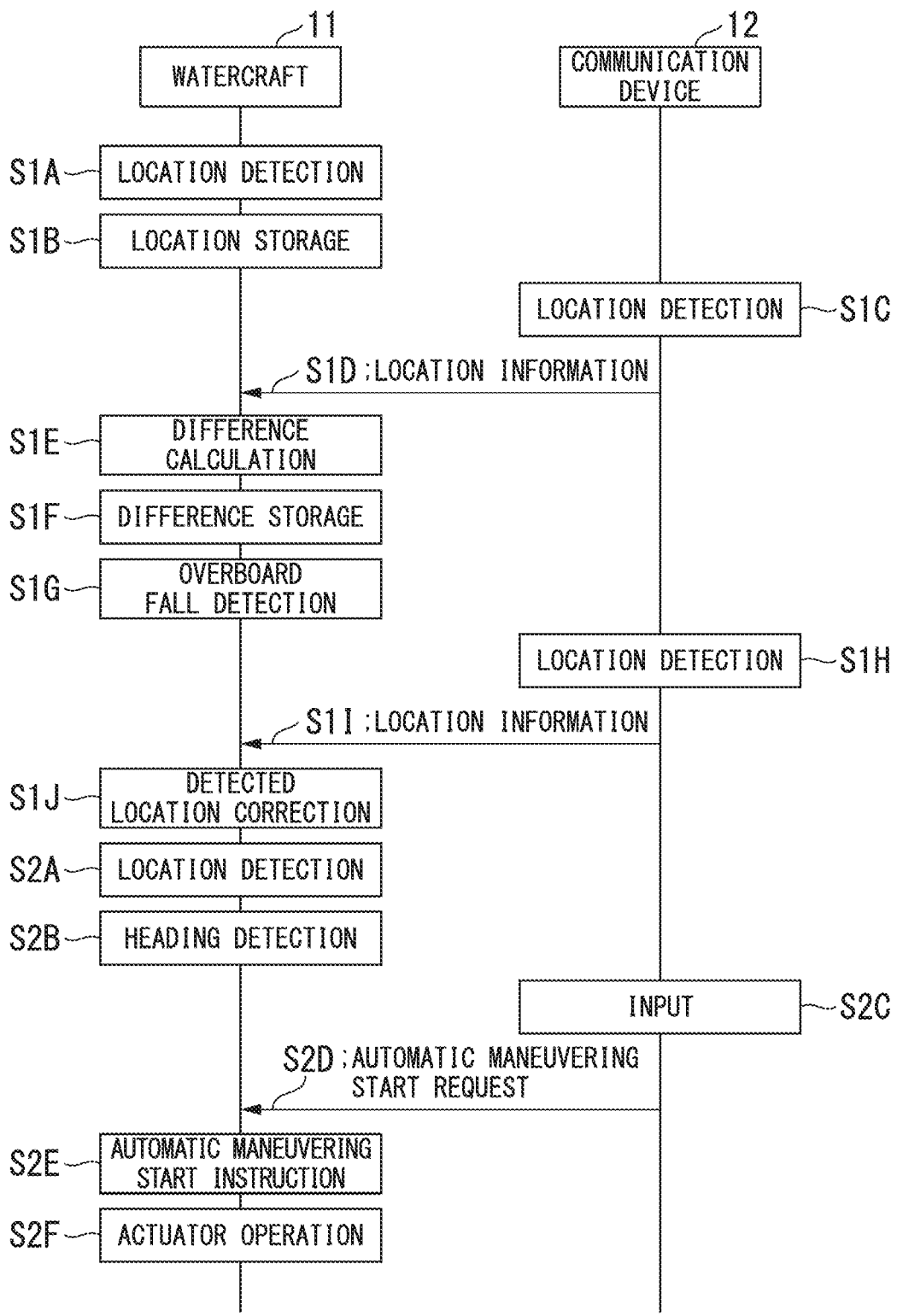
FIG. 3 is a sequence diagram for describing another example of the process executed in the watercraft control system of the first embodiment.

FIG. 3 is a sequence diagram for describing another example of the process executed in the watercraft control system 1 of the first embodiment.

In the examples shown in FIGS. 2 and 4, in step S1A, the watercraft location detection unit 11E of the watercraft 11 detects the location (X1, Y1) of the watercraft 11 (see FIG. 4A).

Subsequently, in step S1B, the storage unit 11J of the watercraft 11 stores the location (X1, Y1) of the watercraft 11 detected in step S14.

Subsequently, in step S1C, the communication device location detection unit 12A of the communication device 12 detects the location (X2, Y2) of the communication device 12 (see FIG. 4A).

Subsequently, in step S1D, the communication unit 12B of the communication device 12 transmits information indicating the location (X2, Y2) of the communication device 12 detected in step S1C and the communication unit 11G of the watercraft 11 receives the information.

Subsequently, in step S1E, the difference calculation unit 11H of the watercraft 11 calculates a difference ($\Delta X(=X2-X1)$, $\Delta Y (=Y2-Y1)$) between the location (X2, Y2) of the communication device 12 detected in step S1C and the location (X1, Y1) of the watercraft 11 detected in step S1A (i.e., a difference between the identical location time-specific communication device location and the identical location time-specific watercraft location).

Subsequently, in step S1F, the storage unit 11J of the watercraft 11 stores the difference calculated in step S1E.

Subsequently, in step S1G, the overboard fall detection unit 11D1 of the watercraft 11 detects the falling of the occupant of the watercraft 11 overboard.

Subsequently, in step S1H, the communication device location detection unit 12A of the communication device 12 detects the location (X3, Y3) of the communication device 12 (see FIG. 4B). That is, the communication device location detection unit 12A detects the location (X3, Y3) of the communication device 12 after the overboard fall (i.e., the location of the communication device 12 when the watercraft 11 and the communication device 12 are away from each other).

Subsequently, in step S1I, the communication unit 12B of the communication device 12 transmits information indicating the location (X3, Y3) of the communication device 12 detected in step S1H and the communication unit 11G of the watercraft 11 receives the information.

Subsequently, in step S1J, the detected location correction unit 11I of the watercraft 11 corrects the location (X3, Y3) of the communication device 12 detected in step S1H.

In detail, the detected location correction unit 11I corrects the location (X3, Y3) of the communication device 12 detected in step S1H on the basis of the difference ($\Delta X (=X2-X1)$, $\Delta Y (=Y2-Y1)$) between the non-overboard-fall time-specific communication device location (X2, Y2) and the non-overboard-fall time-specific watercraft location (X1, Y1) and calculates the corrected location (X3$\Delta X$, Y3$-\Delta Y$) of the communication device 12 (see FIG. 4B).

Also, in step S2A, the watercraft location detection unit 11E of the watercraft 11 detects the location (X1, Y1) of the watercraft 11 (see FIG. 4B). That is, the watercraft location detection unit 11E detects the location (X1, Y1) of the watercraft 11 after the overboard fall.

Also, in step S2B, the heading detection unit 11F of the watercraft 11 detects the heading of the watercraft 11.

Also, in step S2C, the input unit 12C of the communication device 12 receives an automatic maneuvering start request from the watercraft operator who has fallen overboard from the watercraft 11 while carrying the communication device 12.

Subsequently, in step S2D, the communication unit 12B of the communication device 12 transmits the automatic maneuvering start request received in step S2C and the communication unit 11G of the watercraft 11 receives the automatic maneuvering start request.

Subsequently, in step S2E, the automatic maneuvering start instruction unit 11D2 of the watercraft 11 outputs an automatic maneuvering start instruction on the basis of the automatic maneuvering start request.

Subsequently, in step S2F, the watercraft control device 11C of the watercraft 11 operates the actuator 11A on the basis of the relative locations of the watercraft 11 and the communication device 12 and the heading of the watercraft 11 and starts the control of the automatic maneuvering mode.

Although the watercraft 11 includes the difference calculation unit 11H, the detected location correction unit 11I, and the storage unit 11J in the above-described example, a difference calculation unit 11H (not shown) having a function similar to that of the difference calculation unit 11H, a detected location correction unit (not shown) having a function similar to that of the detected location correction unit 11I, and a storage unit (not shown) having a function similar to that of the storage unit 11J may be provided in the communication device 12 in another example.

Second Embodiment

A second embodiment of a watercraft control system, a watercraft control method, and a program of the present invention will be described below.

A watercraft control system 1 of the second embodiment is configured like the watercraft control system 1 of the first embodiment described above, except for differences to be described below. Accordingly, according to the watercraft control system 1 of the second embodiment, it is possible to obtain effects similar to those of the watercraft control system 1 of the first embodiment described above, except for the differences to be described below.

The watercraft control system 1 of the second embodiment is configured like the watercraft control system 1 of the first embodiment shown in FIG. 1.

A watercraft 11 of the second embodiment is configured like the watercraft 11 of the first embodiment shown in FIG. 1 and includes an actuator 11A, an operation unit 11B, a watercraft control device 11C, a trigger generation unit 11D, a watercraft location detection unit 11E, a heading detection unit 11F, a communication unit 11G, a difference calculation unit 11H, a detected location correction unit 11I, and a storage unit 11J.

The trigger generation unit 11D of the second embodiment is configured like the trigger generation unit 11D of the first embodiment shown in FIG. 1 and includes an overboard fall detection unit 11D1, an automatic maneuvering start instruction unit 11D2, and an input unit 11D3.

A communication device 12 of the second embodiment is configured like the communication device 12 of the first embodiment shown in FIG. 1 and includes a communication device location detection unit 12A, a communication unit 12B, and an input unit 12C.

The difference calculation unit 11H of the second embodiment is configured like the difference calculation unit 11H of the first embodiment shown in FIG. 1 and calculates a difference between a location of the communication device 12 detected by the communication device location detection unit 12A and a location of the watercraft 11 detected by the watercraft location detection unit 11E.

As described above, the detected location correction unit 11I of the first embodiment corrects the location of the communication device 12 detected by the communication device location detection unit 12A.

On the other hand, the detected location correction unit 11I of the second embodiment corrects the location of the watercraft 11 detected by the watercraft location detection unit 11E.

In detail, the detected location correction unit 11I of the second embodiment corrects the location of the watercraft 11 detected by the watercraft location detection unit 11E on the basis of the difference between the location of the communication device 12 detected by the communication device location detection unit 12A (the identical location time-specific communication device location (for example, a non-overboard-fall time-specific communication device location)) and the location of the watercraft 11 detected by the watercraft location detection unit 11E (an identical location time-specific watercraft location (for example, a non-overboard-fall time-specific watercraft location)). Specifically, when a difference between the identical location time-specific communication device location (for example, the non-overboard-fall time-specific communication device location) and the identical location time-specific watercraft location (for example, the non-overboard-fall time-specific watercraft location) does not become zero, the detected location correction unit 11I of the second embodiment offsets (corrects) the location of the watercraft 11 detected by the watercraft location detection unit 11E so that the difference between the identical location time-specific communication device location (for example, the non-overboard-fall time-specific communication device location) and the identical location time-specific watercraft location (for example, the non-overboard-fall time-specific watercraft location) becomes zero.

The storage unit 11J of the second embodiment is configured like the storage unit 11J of the first embodiment shown in FIG. 1 and stores the location of the communication device 12 detected by the communication device location detection unit 12A and the location of the watercraft 11 detected by the watercraft location detection unit 11E.

In detail, the storage unit 11J of the second embodiment stores the identical location time-specific communication device location and the identical location time-specific watercraft location. For example, the storage unit 11J of the second embodiment stores the location of the communication device 12 detected by the communication device location detection unit 12A when the overboard fall detection unit 11D1 has not detected the falling of the occupant of the watercraft 11 overboard (the non-overboard-fall time-specific communication device location) and the location of the watercraft 11 detected by the watercraft location detection unit 11E when the overboard fall detection unit 11D1 has not detected the falling of the occupant of the watercraft 11 overboard (the non-overboard-fall time-specific watercraft location).

When the location of the communication device 12 and the location of the watercraft 11 are away from each other, the difference calculation unit 11H calculates the difference between the identical location time-specific communication device location and the identical location time-specific watercraft location stored in the storage unit 11J. For example, when the overboard fall detection unit 11D1 has detected the falling of the occupant of the watercraft 11 overboard, the difference calculation unit 11H calculates a difference between the non-overboard-fall time-specific communication device location (for example, the location of the communication device 12 detected by the communication device location detection unit 12A immediately before the overboard fall) stored in the storage unit 11J and the non-overboard-fall time-specific watercraft location (for example, the location of the watercraft 11 detected by the watercraft location detection unit 11E immediately before the overboard fall) stored in the storage unit 11J.

The detected location correction unit 11I corrects the location of the watercraft 11 detected by the watercraft location detection unit 11E on the basis of the difference between the identical location time-specific communication device location and the identical location time-specific watercraft location stored in the storage unit 11J. For example, the detected location correction unit 11I corrects the location of the watercraft 11 detected by the watercraft location detection unit 11E after the overboard fall detection unit 11D1 detects the falling of the occupant of the watercraft 11 overboard on the basis of the difference between the non-overboard-fall time-specific communication device location stored in the storage unit 11J and the non-overboard-fall time-specific watercraft location stored in the storage unit 11J.

FIG. 5 is a sequence diagram for describing an example of a process executed in the watercraft control system 1 of the second embodiment. FIG. 7A and FIG. 7B is a diagram showing an example of a relationship between the watercraft 11 and the communication device 12 during the execution of the process shown in FIG. 5.

In the examples shown in FIGS. 5, FIG. 7A, and FIG. 7B, in step S31, the watercraft location detection unit 11E of the watercraft 11 detects the location (X6, Y6) of the watercraft 11 (see FIG. 7A).

Subsequently, in step S32, the storage unit 11J of the watercraft 11 stores the location (X6, Y6) of the watercraft 11 detected in step S31.

Also, in step S33, the communication device location detection unit 12A of the communication device 12 detects the location (X5, Y5) of the communication device 12 (see FIG. 7A).

Subsequently, in step S34, the communication unit 12B of the communication device 12 transmits information indicating the location (X5, Y5) of the communication device 12 detected in step S33 and the communication unit 11G of the watercraft 11 receives the information.

Subsequently, in step S35, the storage unit 11J of the watercraft 11 stores the location (X5, Y5) of the communication device 12 detected in step S33.

Subsequently, in step S36, the overboard fall detection unit 11D1 of the watercraft 11 detects the falling of the occupant of the watercraft 11 overboard.

That is, in the step previous to step S36, the actual location of the communication device 12 is identical to the actual location of the watercraft 11, the location of the watercraft 11 detected in step S31 is the identical location time-specific watercraft location, and the location of the communication device 12 detected in step S33 is the identical location time-specific communication device location. On the other hand, the location (X6, Y6) of the watercraft 11 detected in step S31 and the location (X5, Y5) of the communication device 12 detected in step S33 have a relative error ($\Delta X(=X6-X5)$, $\Delta Y (=Y6-Y5)$) and the location (X6, Y6) of the watercraft 11 detected in step S31 may not be identical to the location (X5, Y5) of the communication device 12 detected in step S33.

Thus, subsequently, in step S37, the difference calculation unit 11H of the watercraft 11 calculates a difference ($\Delta X$ ($=X6-X5$), $\Delta Y$ ($=Y6-Y5$)) between the location (X6, Y6) of the watercraft 11 stored in step S32 (i.e., the location (X6, Y6) of the watercraft 11 detected in step S31 before the overboard fall) and the location (X5, Y5) of the communication device 12 stored in step S35 (i.e., the location (X5, Y5) of the communication device 12 detected in step S33 before the overboard fall) (i.e., a difference between the identical location time-specific watercraft location and the identical location time-specific communication device location).

Also, in step S38, the watercraft location detection unit 11E of the watercraft 11 detects the location (X6, Y6) of the watercraft 11 (see FIG. 7B). That is, the watercraft location detection unit 11E detects the location (X6, Y6) of the watercraft 11 after the overboard fall (i.e., the location of the communication device 12 when the watercraft 11 and the communication device 12 are away from each other).

Subsequently, in step S39, the detected location correction unit 11I of the watercraft 11 corrects the location (X6, Y6) of the watercraft 11 detected in step S38.

In detail, the detected location correction unit 11I corrects the location (X6, Y6) of the watercraft 11 detected in step S38 on the basis of the difference ($\Delta X(=X6-X5)$, $\Delta Y$ ($=Y6-Y5$)) between the non-overboard-fall time-specific communication device location (X5, Y5) and the non-overboard-fall time-specific watercraft location (X6, Y6) and calculates the corrected location ($X6\Delta-X$, $Y6-\Delta Y$) of the watercraft 11 (see FIG. 7B).

Also, in step S40, the communication device location detection unit 12A of the communication device 12 detects the location (X7, Y7) of the communication device 12 (see FIG. 7B). That is, the communication device location detection unit 12A detects the location (X7, Y7) of the communication device 12 after the overboard fall.

Subsequently, in step S41, the communication unit 12B of the communication device 12 transmits information indicating the location (X7, Y7) of the communication device 12 detected in step S40 and the communication unit 11G of the watercraft 11 receives the information.

Also, in step S42, the heading detection unit 11F of the watercraft 11 detects the heading of the watercraft 11.

Also, in step S43, the input unit 12C of the communication device 12 receives an automatic maneuvering start request from the watercraft operator who has fallen overboard from the watercraft 11 while carrying the communication device 12.

Subsequently, in step S44, the communication unit 12B of the communication device 12 transmits the automatic maneuvering start request received in step S43 and the communication unit 11G of the watercraft 11 receives the automatic maneuvering start request.

Subsequently, in step S45, the automatic maneuvering start instruction unit 11D2 of the watercraft 11 outputs an automatic maneuvering start instruction on the basis of the automatic maneuvering start request.

Subsequently, in step S46, the watercraft control device 11C of the watercraft 11 operates the actuator 11A on the basis of relative locations of the watercraft 11 and the communication device 12 and the heading of the watercraft 11 and starts the control of the automatic maneuvering mode. That is, the watercraft control device 11C operates the actuator 11A on the basis of the location (X7, Y7) of the communication device 12 (see FIG. 7B), the location of the watercraft 11 ($X6-\Delta X$, $Y6-\Delta Y$) after the correction process of the detected location correction unit 11I is performed (see FIG. 7B), and the heading of the watercraft 11.

In detail, the watercraft control device 11C operates the actuator 11A so that a distance between the location (X7, Y7) of the communication device 12 and the location ($X6-\Delta X$, $Y6-\Delta Y$) of the watercraft 11 after a correction process of the detected location correction unit 11I is performed is less than a distance when the overboard fall detection unit 11D1 has detected the falling of the occupant of the watercraft 11 overboard. As a result, the watercraft 11 is automatically maneuvered to approach the watercraft operator who has fallen overboard from the watercraft 11 while carrying the communication device 12.

For example, in the automatic maneuvering mode, the watercraft control device 11C executes a control process of decreasing an angle difference between a heading angle of the watercraft 11 and an azimuth angle of the communication device 12 in the watercraft 11 and decreasing a distance between the location of the watercraft 11 after the correction process of the detected location correction unit 11I is performed and the location of the communication device 12.

Figure 6:
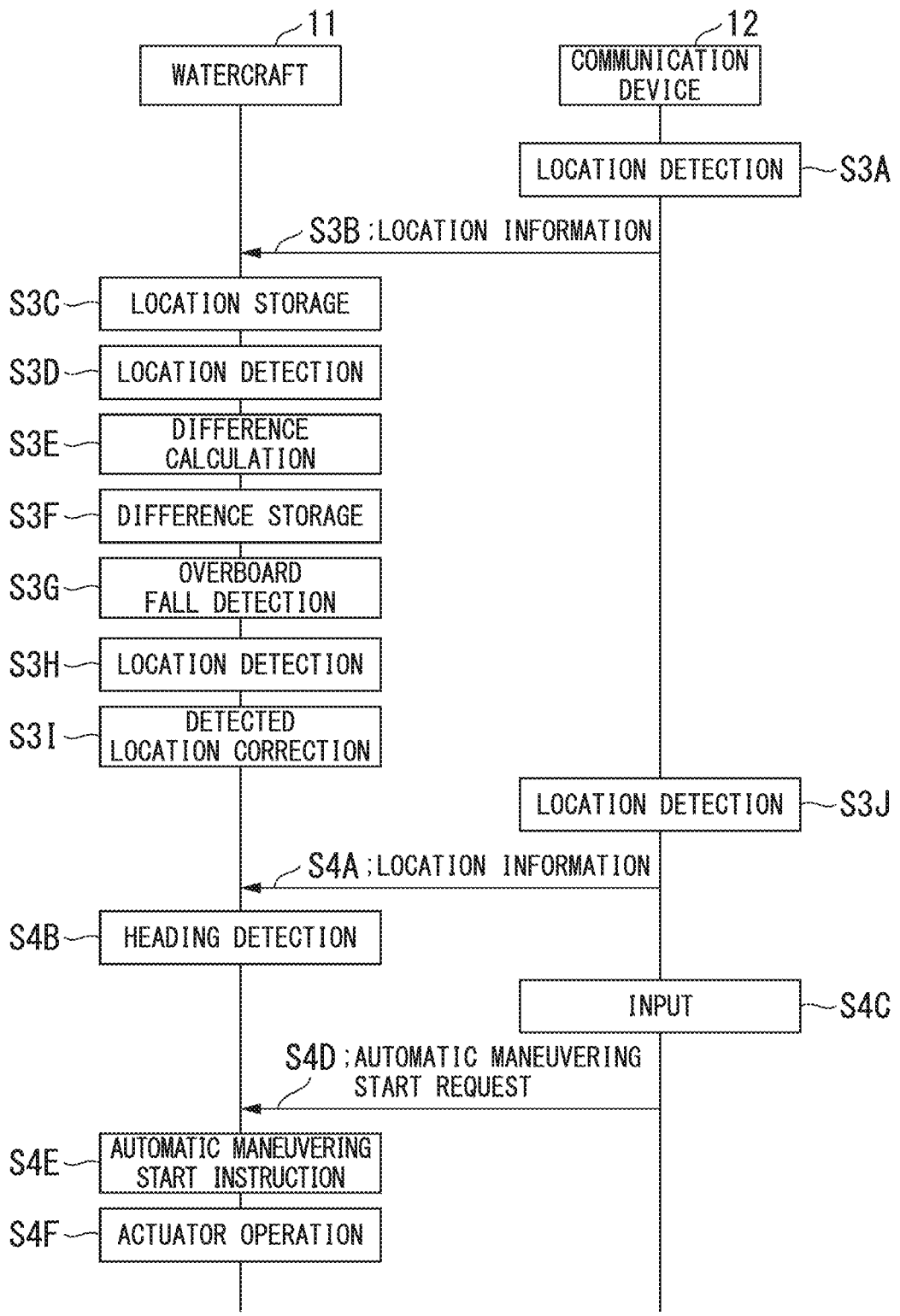
FIG. 6 is a sequence diagram for describing another example of the process executed in the watercraft control system of the second embodiment.

FIG. 6 is a sequence diagram for describing another example of the process executed in the watercraft control system 1 of the second embodiment.

In the example shown in FIGS. 6 and 7, in step S3A, the communication device location detection unit 12A of the communication device 12 detects the location (X5, Y5) of the communication device 12 (see FIG. 7A).

Subsequently, in step S3B, the communication unit 12B of the communication device 12 transmits information indicating the location (X5, Y5) of the communication device 12 detected in step S3A and the communication unit 11G of the watercraft 11 receives the information.

Subsequently, in step S3C, the storage unit 11J of the watercraft 11 stores the location (X5, Y5) of the communication device 12 detected in step S3A.

Subsequently, in step S3D, the watercraft location detection unit 11E of the watercraft 11 detects the location (X6, Y6) of the watercraft 11 (see FIG. 7A).

Subsequently, in step S3E, the difference calculation unit 11H of the watercraft 11 calculates a difference ($\Delta X(=X6-X5)$, $\Delta Y$ ($=Y6-Y5$)) between the location (X6, Y6) of the watercraft 11 detected in step S3D and the location (X5, Y5) of the communication device 12 detected in step S3A (i.e., a difference between the identical location time-specific watercraft location and the identical location time-specific communication device location).

Subsequently, in step S3F, the storage unit 11J of the watercraft 11 stores the difference calculated in step S3E.

Subsequently, in step S3G, the overboard fall detection unit 11D1 of the watercraft 11 detects that the occupant of the watercraft 11 has fallen overboard.

Subsequently, in step S3H, the watercraft location detection unit 11E of the watercraft 11 detects the location (X6, Y6) of the watercraft 11 (see FIG. 7B). That is, the watercraft location detection unit 11E detects the location (X6, Y6) of the watercraft 11 after the overboard fall (i.e., the location of the communication device 12 when the watercraft 11 and the communication device 12 are away from each other).

Subsequently, in step S3I, the detected location correction unit 11I of the watercraft 11 corrects the location (X6, Y6) of the watercraft 11 detected in step S3H.

In detail, the detected location correction unit 11I corrects the location (X6, Y6) of the watercraft 11 detected in step S3H on the basis of the difference ($\Delta X(=X6-X5)$, $\Delta Y$ ($=Y6-Y5$)) between the non-overboard-fall time-specific communication device location (X5, Y5) and the non-overboard-fall time-specific watercraft location (X6, Y6) and calculates the corrected location (X6−ΔX, Y6−ΔY) of the watercraft 11 (see FIG. 7B).

Also, in step S3J, the communication device location detection unit 12A of the communication device 12 detects the location (X7, Y7) of the communication device 12 (see FIG. 7B). That is, the communication device location detection unit 12A detects the location (X7, Y7) of the communication device 12 after the overboard fall.

Subsequently, in step S4A, the communication unit 12B of the communication device 12 transmits information indicating the location (X7, Y7) of the communication device 12 detected in step S3J and the communication unit 11G of the watercraft 11 receives the information.

Also, in step S4B, the heading detection unit 11F of the watercraft 11 detects the heading of the watercraft 11.

Also, in step S4C, the input unit 12C of the communication device 12 receives an automatic maneuvering start request from the watercraft operator who has fallen overboard from the watercraft 11 while carrying the communication device 12.

Subsequently, in step S4D, the communication unit 12B of the communication device 12 transmits the automatic maneuvering start request received in step S4C and the communication unit 11G of the watercraft 11 receives the automatic maneuvering start request.

Subsequently, in step S4E, the automatic maneuvering start instruction unit 11D2 of the watercraft 11 outputs an automatic maneuvering start instruction on the basis of the automatic maneuvering start request.

Subsequently, in step S4F, the watercraft control device 11C of the watercraft 11 operates the actuator 11A on the basis of the relative locations of the watercraft 11 and the communication device 12 and the heading of the watercraft 11 and starts the control of the automatic maneuvering mode.

As described above, in the watercraft control system 1 of the first or second embodiment, it is possible to improve the accuracy with which the watercraft 11 is moved close to the watercraft operator who has fallen overboard from the watercraft 11 while carrying the communication device 12 in an automatic maneuvering process.

In detail, in the watercraft control system 1 of the first or second embodiment, it is possible to make the watercraft 11 close to a person who has fallen overboard (in detail, the watercraft operator who has fallen overboard from the watercraft 11 while carrying the communication device 12) in an automatic maneuvering mode using information of the location of the communication device 12 detected by the communication device location detection unit 12A and information of the location of the watercraft 11 detected by the watercraft location detection unit 11E even if the location of the communication device 12 detected by the communication device location detection unit 12A is not identical to the location of the watercraft 11 detected by the watercraft location detection unit 11E when the locations should be identical to each other (i.e., before the overboard fall).

Third Embodiment

A third embodiment of a watercraft control system, a watercraft control method, and a program of the present invention will be described below.

A watercraft control system 1 of the third embodiment is configured like the watercraft control system 1 of the first or second embodiment described above, except for differences to be described below. Accordingly, according to the watercraft control system 1 of the third embodiment, it is possible to obtain effects similar to those of the watercraft control system 1 of the first or second embodiment described above, except for the differences to be described below.

As described above, in the watercraft control system 1 of the first or second embodiment, the overboard fall detection unit 11D1 of the watercraft 11 is configured like, for example, the lanyard cord and the switch described in paragraph 0002 of Japanese Patent No. 4205261, and detects the falling of an occupant of the watercraft 11 (for example, the watercraft operator or an occupant other than the watercraft operator) overboard when the other end of the lanyard cord is disconnected from the switch.

On the other hand, in the watercraft control system 1 of the third embodiment, an overboard fall detection unit 11D1 detects the falling of a watercraft operator of a watercraft 11 overboard on the basis of a distance between a location of a watercraft 11 detected by a watercraft location detection unit 11E and a location of the communication device detected by a communication device location detection unit 12A of a communication device 12 (in detail, the distance between the location of the watercraft 11 after a correction process of a detected location correction unit 11I is performed and the location of the communication device 12). Specifically, when the distance between the location of the watercraft 11 after the correction process of the detected location correction unit 11I is performed and the location of the communication device 12 is greater than a prescribed threshold value, the overboard fall detection unit 11D1 estimates that an occupant of the watercraft 11 has fallen overboard. As a result, a trigger generation unit 11D generates a trigger, a watercraft control device 11C is in an automatic maneuvering mode and operates an actuator 11A on the basis of relative locations of the watercraft 11 and the communication device 12 and heading of the watercraft 11. That is, the watercraft control device 11C starts the control of the automatic maneuvering mode.

Fourth Embodiment

A fourth embodiment of a watercraft control system, a watercraft control method, and a program of the present invention will be described below.

A watercraft control system 1 of the fourth embodiment is configured like the watercraft control system 1 of the first or second embodiment described above, except for differences to be described below. Accordingly, according to the watercraft control system 1 of the fourth embodiment, it is possible to obtain effects similar to those of the watercraft control system 1 of the first or second embodiment described above, except for the differences to be described below.

As described above, the watercraft 11 of the first or second embodiment is, for example, a PWC having functions similar to those of the PWC (a water motorcycle) described in FIG. 1 of Japanese Patent No. 5196649.

On the other hand, a watercraft 11 of the fourth embodiment is, for example, a watercraft having functions similar to those of the watercraft described in FIG. 1 of Japanese Patent No. 6198192.

An actuator 11A of the watercraft 11 of the fourth embodiment has a function of generating a propulsive force for the watercraft 11 and a function of generating a turning moment in the watercraft 11. The actuator 11A includes, for example, the outboard motor, the engine, the actuator, the shift mechanism, and the like described in FIG. 1 of Japanese Patent No. 6198192.

An operation unit 11B of the watercraft 11 of the fourth embodiment receives an input operation of a watercraft operator who operates the actuator 11A. The operation unit 11B is configured like, for example, the steering wheel, the remote-control device, the operation lever, and the like described in FIG. 1 of Japanese Patent No. 6198192. For example, a joystick or the like may be included in the operation unit 11B of the watercraft 11 of the fourth embodiment.

Fifth Embodiment

A fifth embodiment of a watercraft control system, a watercraft control method, and a program of the present invention will be described below.

A watercraft control system 1 of the fifth embodiment is configured like the watercraft control system 1 of the first embodiment described above, except for differences to be described below. Accordingly, according to the watercraft control system 1 of the fifth embodiment, it is possible to obtain effects similar to those of the watercraft control system 1 of the first embodiment described above, except for the differences to be described below.

Figure 8:
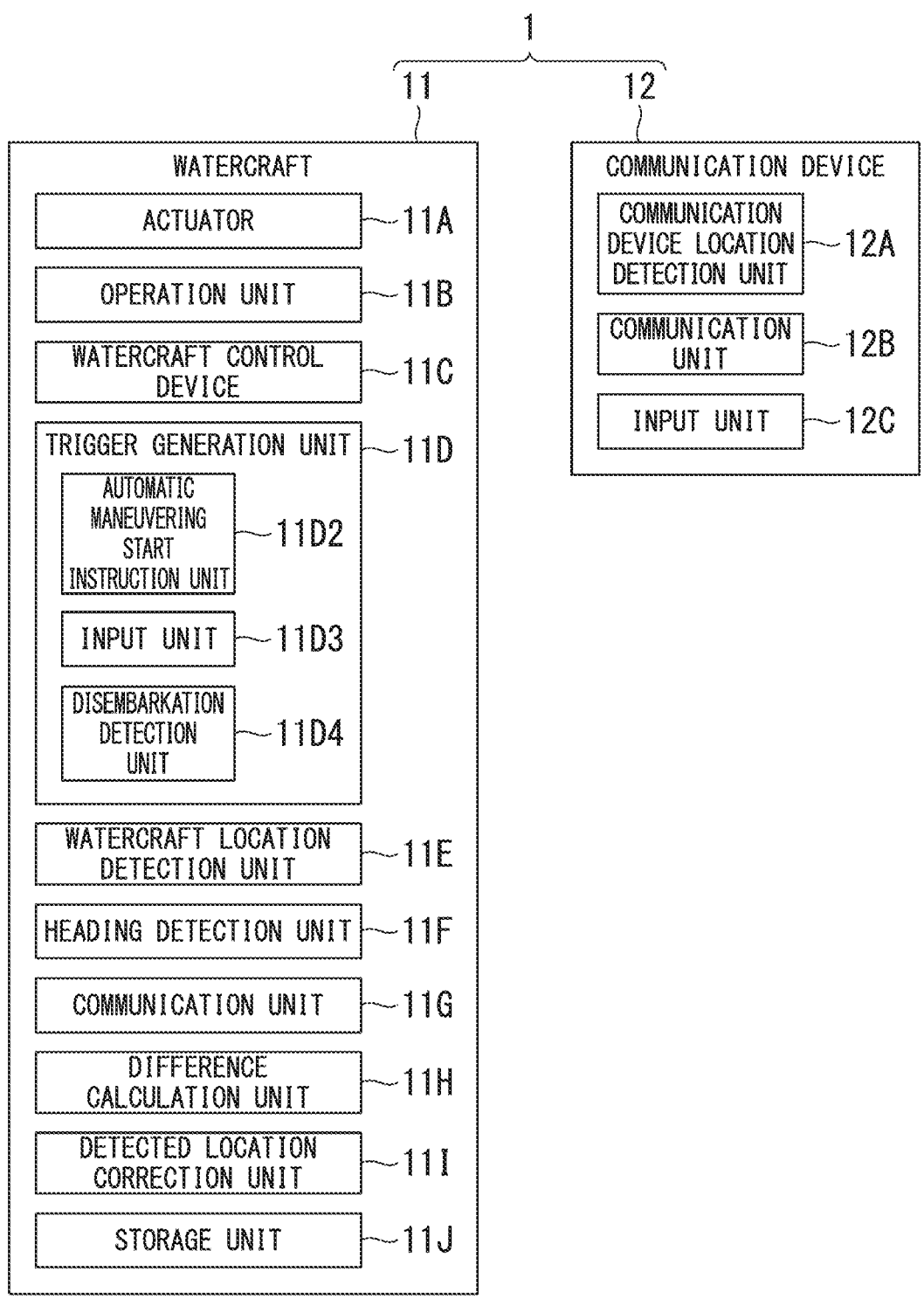
FIG. 8 is a diagram schematically showing an example of a watercraft control system of a fifth embodiment.

FIG. 8 is a diagram schematically showing an example of the watercraft control system 1 of the fifth embodiment.

In the example shown in FIG. 8, the watercraft control system 1 includes a watercraft 11 and a communication device 12.

The watercraft 11 of the fifth embodiment is, for example, a PWC having functions similar to those of the PWC described in FIG. 1 of Japanese Patent No. 5196649. The watercraft 11 includes an actuator 11A configured like the actuator 11A of the first embodiment, an operation unit 11B configured like the operation unit 11B of the first embodiment, a watercraft control device 11C, a trigger generation unit 11D, a watercraft location detection unit 11E configured like the watercraft location detection unit 11E of the first embodiment, a heading detection unit 11F configured like the heading detection unit 11F of the first embodiment, a communication unit 11G configured like the communication unit 11G of the first embodiment, a difference calculation unit 11H, a detected location correction unit 11I, and a storage unit 11J.

The watercraft control device 11C performs a control process of operating the actuator 11A or the like on the basis of an input operation of the watercraft operator received by the operation unit 11B. The watercraft control device 11C has a manual maneuvering mode in which the actuator 11A is operated on the basis of the watercraft operator's input operation received by the operation unit 11B and an automatic maneuvering mode in which the actuator 11A is operated on the basis of the relative locations of the watercraft 11 and the communication device 12 and the heading of the watercraft 11.

The trigger generation unit 11D generates a trigger for switching the mode of the watercraft control device 11C from the manual maneuvering mode to the automatic maneuvering mode. The trigger generation unit 11D includes an automatic maneuvering start instruction unit 11D2, an input unit 11D3, and a disembarkation detection unit 11D4.

The disembarkation detection unit 11D4 detects the disembarkation of the occupant of the watercraft 11. For example, disembarkation for snorkeling around the watercraft 11, disembarkation for the purpose of the occupant of the watercraft 11 to guide (move) the watercraft 11 from a location outside of the watercraft 11, and the like are included as the disembarkation of the occupant of the watercraft 11 detected by the disembarkation detection unit 11D4. The disembarkation detection unit 11D4 detects the disembarkation of the occupant of the watercraft 11, for example, by detecting an operation in which the occupant of the watercraft 11 turns on a switch (not shown) or the like.

The input unit 11D3 receives, for example, an automatic maneuvering start request from the watercraft operator of the watercraft 11 (for example, an automatic maneuvering start request from the watercraft operator who is about to disembark from the watercraft 11 while carrying the communication device 12).

The automatic maneuvering start instruction unit 11D2 outputs an automatic maneuvering start instruction when the disembarkation detection unit 11D4 detects disembarkation of the occupant of the watercraft 11 and the input unit 11D3 receives an automatic maneuvering start request or when the input unit 12C of the communication device 12 starts an automatic maneuvering start request. When the automatic maneuvering start instruction unit 11D2 outputs the automatic maneuvering start instruction, the watercraft control device 11C starts a control process of operating the actuator 11A (a process of controlling the automatic maneuvering mode) without any need for the operation unit 11B to receive an input operation. In the automatic maneuvering mode, the watercraft control device 11C controls the actuator 11A on the basis of the relative locations of the watercraft 11 and the communication device 12 (in detail, the communication device 12 carried by the watercraft operator who has disembarked from the watercraft 11) and the heading of the watercraft 11.

The communication device 12 of the fifth embodiment includes a communication device location detection unit 12A configured like the communication device location detection unit 12A of the first embodiment, a communication unit 12B configured like the communication unit 12B of the first embodiment, and an input unit 12C configured like the input unit 12C of the first embodiment.

The input unit 12C receives, for example, an automatic maneuvering start request from the watercraft operator of the watercraft 11 (for example, an automatic maneuvering start request from the watercraft operator who has disembarked from the watercraft 11 while carrying the communication device 12).

The difference calculation unit 11H calculates a difference between the location of the communication device 12 detected by the communication device location detection unit 12A and the location of the watercraft 11 detected by the watercraft location detection unit 11E. In detail, the difference calculation unit 11H calculates a difference between a pre-disembarkation communication device location that is the location of the communication device 12 detected by the communication device location detection unit 12A before the disembarkation detection unit 11D4 detects the disembarkation of the occupant of the watercraft 11 and a pre-disembarkation watercraft location that is the location of the watercraft 11 detected by the watercraft location detection unit 11E before the disembarkation detection unit 11D4 detects the disembarkation of the occupant of the watercraft 11.

Because the occupant is located on the watercraft 11 before he or she disembarks, the location of the communication device 12 carried by the occupant is identical to the location of the watercraft 11. Thus, when the location of the communication device 12 detected by the communication device location detection unit 12A does not include an error and the location of the watercraft 11 detected by the watercraft location detection unit 11E does not include an error, the difference between the location of the communication device 12 detected by the communication device location detection unit 12A and the location of the watercraft 11 detected by the watercraft location detection unit 11E becomes zero before the occupant disembarks.

In the example shown in FIG. 8, using this fact, the detected location correction unit 11I corrects the location of the communication device 12 detected by the communication device location detection unit 12A.

In detail, the detected location correction unit 11I corrects the location of the communication device 12 detected by the communication device location detection unit 12A on the basis of the difference between the pre-disembarkation communication device location and the pre-disembarkation watercraft location. Specifically, when the difference between the pre-disembarkation communication device location and the pre-disembarkation watercraft location is not zero, the detected location correction unit 11I offsets (corrects) the location of the communication device 12 detected by the communication device location detection unit 12A so that the difference between the pre-disembarkation communication device location and the pre-disembarkation watercraft location becomes zero.

The storage unit 11J stores the location of the communication device 12 detected by the communication device location detection unit 12A and the location of the watercraft 11 detected by the watercraft location detection unit 11E.

In detail, the storage unit 11J stores the location of the communication device 12 detected by the communication device location detection unit 12A before the disembarkation detection unit 11D4 detects the disembarkation of the occupant of the watercraft 11 (the pre-disembarkation communication device location) and the location of the watercraft 11 detected by the watercraft location detection unit 11E before the disembarkation detection unit 11D4 detects the disembarkation of the occupant of the watercraft 11 (the pre-disembarkation watercraft location).

When the disembarkation detection unit 11D4 has detected the disembarkation of the occupant of the watercraft 11, the difference calculation unit 11H calculates a difference between the pre-disembarkation communication device location (for example, the location of the communication device 12 detected by the communication device location detection unit 12A immediately before the disembarkation) stored in the storage unit 11J and the pre-disembarkation watercraft location (the location of the watercraft 11 detected by the watercraft location detection unit 11E immediately before the disembarkation) stored in the storage unit 11J.

The detected location correction unit 11I corrects the location of the communication device 12 detected by the communication device location detection unit 12A after the disembarkation detection unit 11D4 detects the disembarkation of the occupant of the watercraft 11 on the basis of the difference between the pre-disembarkation communication device location stored in the storage unit 11J and the pre-disembarkation watercraft location stored in the storage unit 11J.

Figure 9:
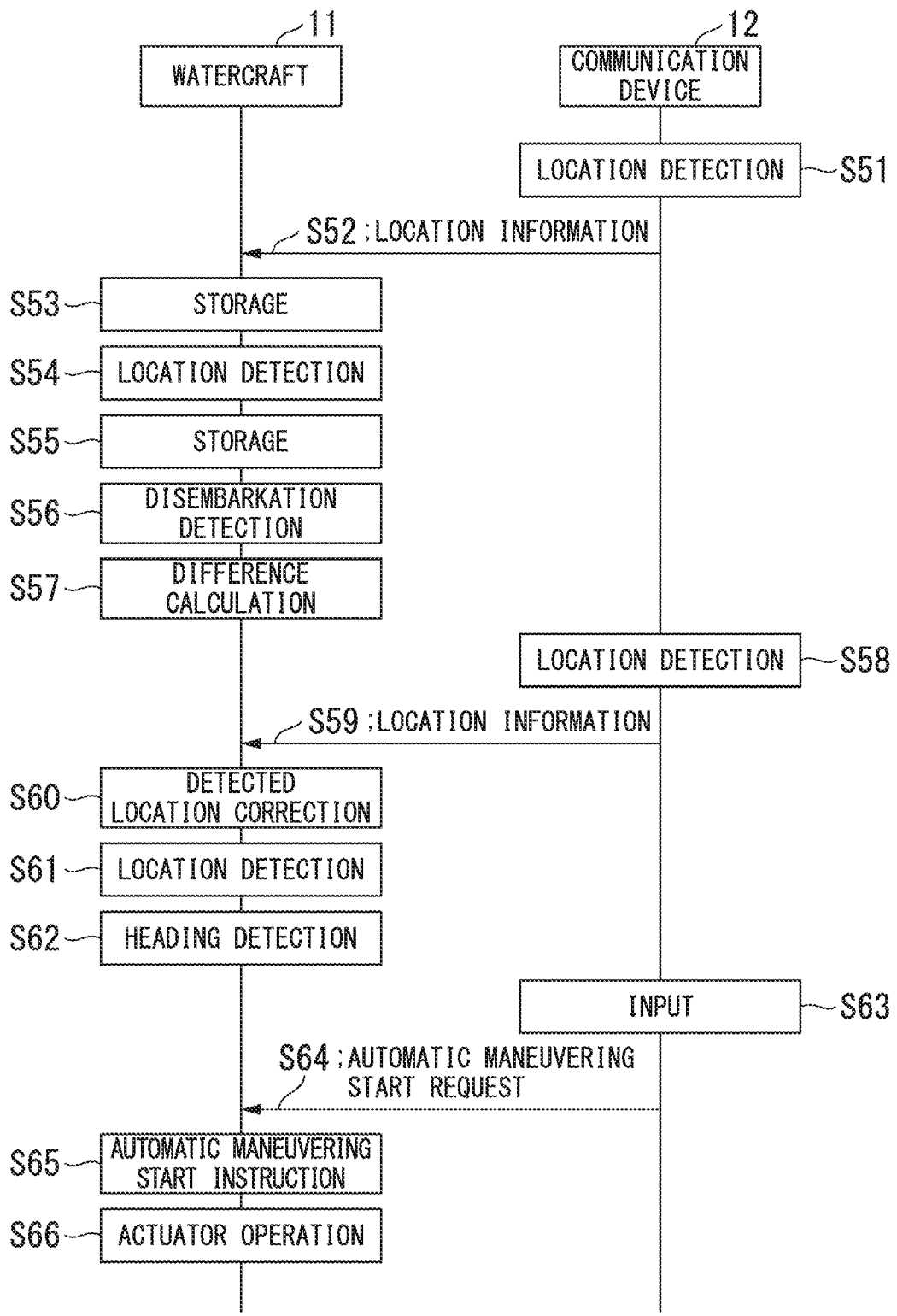
FIG. 9 is a sequence diagram for describing an example of a process executed in the watercraft control system of the fifth embodiment.

FIG. 9 is a sequence diagram for describing an example of a process executed in the watercraft control system 1 of the fifth embodiment.

In the example shown in FIG. 9, in step S51, the communication device location detection unit 12A of the communication device 12 detects the location of the communication device 12.

Subsequently, in step S52, the communication unit 12B of the communication device 12 transmits information indicating the location of the communication device 12 detected in step S51 and the communication unit 11G of the watercraft 11 receives the information.

Subsequently, in step S53, the storage unit 11J of the watercraft 11 stores the location of the communication device 12 detected in step S51.

Also, in step S54, the watercraft location detection unit 11E of the watercraft 11 detects the location of the watercraft 11.

Subsequently, in step S55, the storage unit 11J of the watercraft 11 stores the location of the watercraft 11 detected in step S54.

Subsequently, in step S56, the disembarkation detection unit 11D4 of the watercraft 11 detects the disembarkation of the occupant of the watercraft 11.

That is, in a step before step S56, the actual location of the communication device 12 is identical to the actual location of the watercraft 11. On the other hand, the location of the communication device 12 detected in step S51 and the location of the watercraft 11 detected in step S54 include relative errors and the location of the communication device 12 detected in step S51 is not identical to the location of the watercraft 11 detected in step S54.

Thus, subsequently, in step S57, the difference calculation unit 11H of the watercraft 11 calculates a difference between the location of the communication device 12 stored in step S53 (i.e., the location of the communication device 12 detected in step S51 before disembarkation) and the location of the watercraft 11 stored in step S55 (i.e., the location of the watercraft 11 detected in step S54 before disembarkation).

Also, in step S58, the communication device location detection unit 12A of the communication device 12 detects the location of the communication device 12. That is, the communication device location detection unit 12A detects the location of the communication device 12 after disembarkation.

Subsequently, in step S59, the communication unit 12B of the communication device 12 transmits information indicating the location of the communication device 12 detected in step S58 and the communication unit 11G of the watercraft 11 receives the information.

Subsequently, in step S60, the detected location correction unit 11I of the watercraft 11 corrects the location of the communication device 12 detected in step S58.

In detail, the detected location correction unit 11I corrects the location of the communication device 12 detected in step S58 on the basis of the difference between the pre-disembarkation communication device location and the pre-disembarkation watercraft location and calculates the corrected location of the communication device 12.

Also, in step S61, the watercraft location detection unit 11E of the watercraft 11 detects the location of the watercraft 11. In other words, the watercraft location detection unit 11E detects the location of the watercraft 11 after disembarkation.

Also, in step S62, the heading detection unit 11F of the watercraft 11 detects the heading of the watercraft 11.

Also, in step S63, the input unit 12C of the communication device 12 receives an automatic maneuvering start request from the watercraft operator who has disembarked from the watercraft 11 while carrying the communication device 12.

Subsequently, in step S64, the communication unit 12B of the communication device 12 transmits the automatic maneuvering start request received in step S63 and the communication unit 11G of the watercraft 11 receives the automatic maneuvering start request.

Subsequently, in step S65, the automatic maneuvering start instruction unit 11D2 of the watercraft 11 outputs an automatic maneuvering start instruction on the basis of the automatic maneuvering start request.

Subsequently, in step S66, the watercraft control device 11C of the watercraft 11 operates the actuator 11A on the basis of relative locations of the watercraft 11 and the communication device 12 and the heading of the watercraft 11 and starts the control of the automatic maneuvering mode. That is, the watercraft control device 11C operates the actuator 11A on the basis of the location of the communication device 12 after a correction process of the detected location correction unit 11I is performed, the location of the watercraft 11, and the heading of the watercraft 11.

In detail, the watercraft control device 11C operates the actuator 11A so that the distance between the location of the communication device 12 after the correction process of the detected location correction unit 11I is performed and the location of the watercraft 11 is less than that when the disembarkation detection unit 11D4 has detected the disembarkation of the watercraft operator of the watercraft 11. As a result, the watercraft 11 is moved close to the watercraft operator who has disembarked from the watercraft 11 while carrying the communication device 12 in an automatic maneuvering process.

For example, in the automatic maneuvering mode, the watercraft control device 11C executes a control process of decreasing the angle difference between the heading angle of the watercraft 11 and the azimuth angle of the communication device 12 in the watercraft 11 and decreasing the distance between the location of the communication device 12 after the correction process of the detected location correction unit 11I is performed and the location of the watercraft 11.

Sixth Embodiment

A sixth embodiment of a watercraft control system, a watercraft control method, and a program of the present invention will be described below.

A watercraft control system 1 of the sixth embodiment is configured like the watercraft control system 1 of the fifth embodiment described above, except for differences to be described below. Accordingly, according to the watercraft control system 1 of the sixth embodiment, it is possible to obtain effects similar to those of the watercraft control system 1 of the fifth embodiment described above, except for the differences to be described below.

The watercraft control system 1 of the sixth embodiment is configured like the watercraft control system 1 of the fifth embodiment shown in FIG. 8.

A watercraft 11 of the sixth embodiment is configured like the watercraft 11 of the fifth embodiment shown in FIG. 8 and includes an actuator 11A, an operation unit 11B, a watercraft control device 11C, a trigger generation unit 11D, a watercraft location detection unit 11E, a heading detection unit 11F, a communication unit 11G, a difference calculation unit 11H, a detected location correction unit 11I, and a storage unit 11J.

The trigger generation unit 11D of the sixth embodiment is configured like the trigger generation unit 11D of the fifth embodiment shown in FIG. 8 and includes a disembarkation detection unit 11D4 and an automatic maneuvering start instruction unit 11D2.

A communication device 12 of the sixth embodiment is configured like the communication device 12 of the fifth embodiment shown in FIG. 8 and includes a communication device location detection unit 12A, a communication unit 12B, and an input unit 12C.

The difference calculation unit 11H of the sixth embodiment is configured like the difference calculation unit 11H of the fifth embodiment shown in FIG. 8 and calculates a difference between the location of the communication device 12 detected by the communication device location detection unit 12A and the location of the watercraft 11 detected by the watercraft location detection unit 11E.

As described above, the detected location correction unit 11I of the fifth embodiment corrects the location of the communication device 12 detected by the communication device location detection unit 12A.

On the other hand, the detected location correction unit 11I of the sixth embodiment corrects the location of the watercraft 11 detected by the watercraft location detection unit 11E.

In detail, the detected location correction unit 11I of the sixth embodiment corrects the location of the watercraft 11 detected by the watercraft location detection unit 11E on the basis of a difference between the location of the communication device 12 detected by the communication device location detection unit 12A (a pre-disembarkation communication device location) and the location of the watercraft 11 detected by the watercraft location detection unit 11E (a pre-disembarkation watercraft location). Specifically, when the difference between the pre-disembarkation communication device location and the pre-disembarkation watercraft location is not zero, the detected location correction unit 11I of the sixth embodiment offsets (corrects) the location of the watercraft 11 detected by the watercraft location detection unit 11E so that the difference between the pre-disembarkation communication device location and the pre-disembarkation watercraft location becomes zero.

The storage unit 11J of the sixth embodiment is configured like as the storage unit 11J of the fifth embodiment shown in FIG. 8 and stores the location of the communication device 12 detected by the communication device location detection unit 12A and the location of the watercraft 11 detected by the watercraft location detection unit 11E.

In detail, the storage unit 11J of the sixth embodiment stores the location of the communication device 12 detected by the communication device location detection unit 12A before the disembarkation detection unit 11D4 detects the disembarkation of the occupant of the watercraft 11 (the pre-disembarkation communication device location) and the location of the watercraft 11 detected by the watercraft location detection unit 11E before the disembarkation detection unit 11D4 detects the disembarkation of the occupant of the watercraft 11 (the pre-disembarkation watercraft location).

When the disembarkation detection unit 11D4 has detected the disembarkation of the occupant of the watercraft 11, the difference calculation unit 11H calculates a difference between the pre-disembarkation communication device location (for example, the location of the communication device 12 detected by the communication device location detection unit 12A immediately before the disembarkation) stored in the storage unit 11J and the pre-disembarkation watercraft location (for example, the location of the watercraft 11 detected by the watercraft location detection unit 11E immediately before the disembarkation) stored in the storage unit 11J.

The detected location correction unit 11I corrects the location of the watercraft 11 detected by the watercraft location detection unit 11E after the disembarkation detection unit 11D4 detects the disembarkation of the occupant of the watercraft 11 on the basis of the difference between the pre-disembarkation communication device location stored in the storage unit 11J and the pre-disembarkation watercraft location stored in the storage unit 11J.

Figure 10:
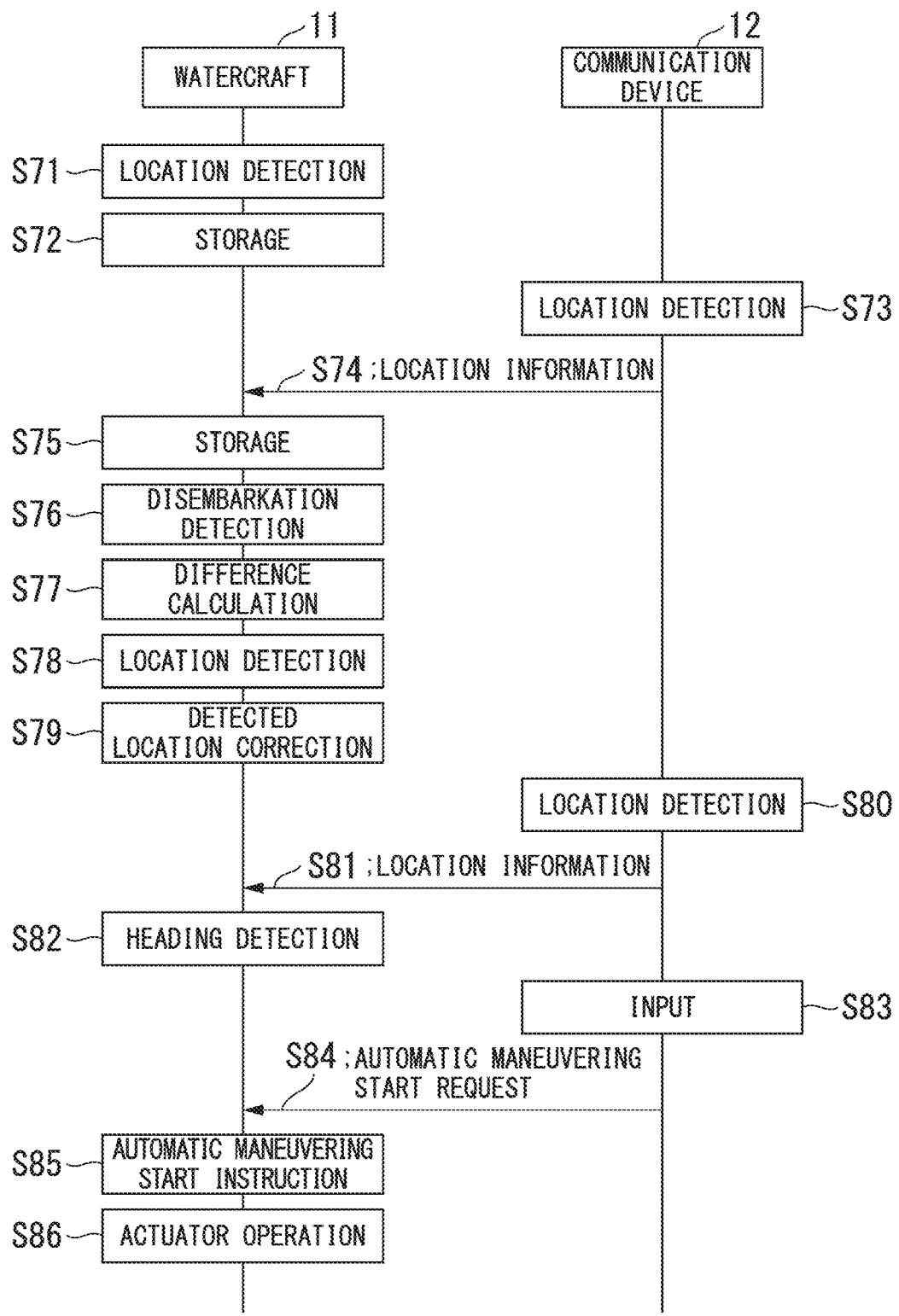
FIG. 10 is a sequence diagram for describing an example of a process executed in a watercraft control system of a sixth embodiment.

FIG. 10 is a sequence diagram for describing an example of a process executed in the watercraft control system 1 of the sixth embodiment.

In the example shown in FIG. 10, the watercraft location detection unit 11E of the watercraft 11 detects the location of the watercraft 11 in step S71.

Subsequently, in step S72, the storage unit 11J of the watercraft 11 stores the location of the watercraft 11 detected in step S71.

Also, in step S73, the communication device location detection unit 12A of the communication device 12 detects the location of the communication device 12.

Subsequently, in step S74, the communication unit 12B of the communication device 12 transmits information indicating the location of the communication device 12 detected in step S73 and the communication unit 11G of the watercraft 11 receives the information.

Subsequently, in step S75, the storage unit 11J of the watercraft 11 stores the location of the communication device 12 detected in step S73.

Subsequently, in step S76, the disembarkation detection unit 11D4 of the watercraft 11 detects the disembarkation of the occupant of the watercraft 11.

That is, in a step before step S76, the actual location of the communication device 12 is identical to the actual location of the watercraft 11. On the other hand, the location of the watercraft 11 detected in step S71 and the location of the communication device 12 detected in step S73 include relative errors and the location of the watercraft 11 detected in step S71 is not identical to the location of the communication device 12 detected in step S73.

Thus, subsequently, in step S77, the difference calculation unit 11H of the watercraft 11 calculates a difference between the location of the watercraft 11 stored in step S72 (i.e., the location of the watercraft 11 detected in step S71 before disembarkation) and the location of the watercraft 11 stored in step S75 (i.e., the location of the communication device 12 detected in step S73 before disembarkation).

Also, in step S78, the watercraft location detection unit 11E of the watercraft 11 detects the location of the watercraft 11. In other words, the watercraft location detection unit 11E detects the location of the watercraft 11 after disembarkation.

Subsequently, in step S79, the detected location correction unit 11I of the watercraft 11 corrects the location of the watercraft 11 detected in step S78.

In detail, the detected location correction unit 11I corrects the location of the watercraft 11 detected in step S78 on the basis of the difference between the pre-disembarkation communication device location and the pre-disembarkation watercraft location and calculates the corrected location of the watercraft 11.

Also, in step S80, the communication device location detection unit 12A of the communication device 12 detects the location of the communication device 12. That is, the communication device location detection unit 12A detects the location of the communication device 12 after disembarkation.

Subsequently, in step S81, the communication unit 12B of the communication device 12 transmits information indicating the location of the communication device 12 detected in step S80, and the communication unit 11G of the watercraft 11 receives the information.

Also, in step S82, the heading detection unit 11F of the watercraft 11 detects the heading of the watercraft 11.

Also, in step S83, the input unit 12C of the communication device 12 receives an automatic maneuvering start request from the watercraft operator who has disembarked from the watercraft 11 while carrying the communication device 12.

Subsequently, in step S84, the communication unit 12B of the communication device 12 transmits the automatic maneuvering start request received in step S83 and the communication unit 11G of the watercraft 11 receives the automatic maneuvering start request.

Subsequently, in step S85, the automatic maneuvering start instruction unit 11D2 of the watercraft 11 outputs an automatic maneuvering start instruction on the basis of the automatic maneuvering start request.

Subsequently, in step S86, the watercraft control device 11C of the watercraft 11 operates the actuator 11A on the basis of the relative locations of the watercraft 11 and the communication device 12 and the heading of the watercraft 11 and starts the control of the automatic maneuvering mode. That is, the watercraft control device 11C operates the actuator 11A on the basis of the location of the communication device 12, the location of the watercraft 11 after the correction process of the detected location correction unit 11I is performed, and the heading of the watercraft 11.

In detail, the watercraft control device 11C operates the actuator 11A so that the distance between the location of the communication device 12 and the location of the watercraft 11 after the correction process of the detected location correction unit 11I is performed is less than that when the disembarkation detection unit 11D4 has detected the disembarkation of the occupant of the watercraft 11. As a result, the watercraft 11 is moved close to the watercraft operator who has disembarked from the watercraft 11 while carrying the communication device 12 in an automatic maneuvering process.

For example, in the automatic maneuvering mode, the watercraft control device 11C executes a control process of decreasing the angle difference between the heading angle of the watercraft 11 and the azimuth angle of the communication device 12 in the watercraft 11 and decreasing the distance between the location of the watercraft 11 after the correction process of the detected location correction unit 11I is performed and the location of the communication device 12.

Seventh Embodiment

An embodiment (a seventh embodiment) of a vehicle control system of the present invention will be described below.

In the seventh embodiment, a vehicle control system includes a vehicle and a communication device configured like the communication device 12 shown in FIG. 1.

The vehicle in the seventh embodiment is, for example, a motorcycle, a bicycle, or an automobile and the vehicle control system in the seventh embodiment is a system for coping with the theft of the vehicle or the like. The vehicle of the seventh embodiment includes a function provided in a typical vehicle, a vehicle location detection unit configured to detect a location of the vehicle, and a communication unit. The vehicle location detection unit has a function similar to that of the watercraft location detection unit 11E shown in FIG. 1. The communication unit of the vehicle has a function similar to that of the communication unit 11G shown in FIG. 1 and communicates with the communication unit of the communication device.

A communication device according to the seventh embodiment is carried by a vehicle user or the like and includes a communication device location detection unit configured to detect the location of the communication device, and a communication unit. The communication device location detection unit has a function similar to that of the communication device location detection unit 12A shown in FIG. 1. The communication unit of the communication device has a function similar to that of the communication unit 12B shown in FIG. 1.

In the seventh embodiment, at least one of the vehicle and the communication device has a difference calculation unit. The difference calculation unit has a function similar to that of the difference calculation unit 11H shown in FIG. 1 and calculates a difference between a location of the communication device detected by the communication device location detection unit and a location of the vehicle detected by the vehicle location detection unit.

Even in the seventh embodiment, as in the example shown in FIG. 1, when relative locations of the vehicle and the communication device include a large error, a detected location correction unit provided in at least one of the vehicle and the communication device corrects the location of the communication device detected by the communication device location detection unit on the basis of, for example, a difference between an identical location time-specific communication device location (for example, an embarkation time-specific communication device location) and an identical location time-specific vehicle location (for example, an embarkation time-specific vehicle location).

For example, when the vehicle is stolen, a user of the vehicle or the like can ascertain the location of the vehicle on the basis of the corrected relative locations of the vehicle and the communication device.

Although modes for carrying out the present invention have been described using embodiments, the present invention is not limited to the embodiments and various modifications and substitutions can also be made without departing from the scope and spirit of the present invention. The configurations described in the above-described embodiments and examples may be combined.

Also, all or some of the functions of the parts provided in the watercraft control system 1 and the vehicle control system according to the above-described embodiment may be implemented by recording a program for implementing the functions on a computer-readable recording medium and causing a computer system to read and execute the program recorded on the recording medium. Also, the "computer system" described here is assumed to include an operating system (OS) and hardware such as peripheral devices.

Also, the "computer-readable recording medium" refers to a flexible disk, a magneto-optical disc, a read only memory (ROM), a portable medium such as a compact disc (CD)-ROM, or a storage unit such as a hard disk embedded in the computer system. Further, the "computer-readable recording medium" may include a computer-readable recording medium for dynamically retaining the program for a short time period as in a communication line when the program is transmitted via a network such as the Internet or a communication circuit such as a telephone circuit and a computer-readable recording medium for retaining the program for a given time period as in a volatile memory inside the computer system serving as a server or a client when the program is transmitted. Also, the above-described program may be a program for implementing some of the above-described functions. Further, the above-described program may be a program capable of implementing the above-described function in combination with a program already recorded on the computer system.

REFERENCE SIGNS LIST

1 Watercraft control system
11 Watercraft
11A Actuator
11B Operation unit
11C Watercraft control device
11D Trigger generation unit
11D1 Overboard fall detection unit
11D2 Automatic maneuvering start instruction unit
11D3 Input unit
11D4 Disembarkation detection unit
11E Watercraft location detection unit
11F Heading detection unit
11G Communication unit
11H Difference calculation unit
11I Detected location correction unit
11J Storage unit
12 Communication device
12A Communication device location detection unit
12B Communication unit
12C Input unit

The invention claimed is:

1. A watercraft control system including a watercraft and a communication device,
wherein the communication device includes
a communication device location detection unit configured to detect a location of the communication device; and
a first communication unit,
wherein the watercraft includes
a watercraft location detection unit configured to detect a location of the watercraft; and
a second communication unit, and
wherein at least one of the watercraft and the communication device includes a difference calculation unit configured to calculate a difference between the location of the communication device detected by the communication device location detection unit and the location of the watercraft detected by the watercraft location detection unit as a location difference at an identical location, when a watercraft operator or an occupant is located on the watercraft; and
a detected location correction unit configured to correct at least one of the location of the communication device detected by the communication device location detection unit and the location of the watercraft detected by the watercraft location detection unit on the basis of the location difference at the identical location, when the watercraft and the communication device carried by the watercraft operator or the occupant are away from each other.

2. The watercraft control system according to claim 1,
wherein the watercraft includes an overboard fall detection unit configured to detect the falling of an occupant of the watercraft overboard,
wherein at least one of the watercraft and the communication device includes a storage unit configured to store a non-overboard-fall time-specific communication device location that is a location of the communication device detected by the communication device location detection unit when the overboard fall detection unit has not detected the falling of the occupant of the watercraft overboard and a non-overboard-fall time-specific watercraft location that is a location of the watercraft detected by the watercraft location detection unit when the overboard fall detection unit has not detected the falling of the occupant of the watercraft overboard, and
wherein the difference calculation unit calculates a difference between the non-overboard-fall time-specific communication device location stored in the storage unit and the non-overboard-fall time-specific watercraft location stored in the storage unit, as the location difference at the identical location.

3. The watercraft control system according to claim 2, wherein, when the overboard fall detection unit has detected the falling of the occupant of the watercraft overboard, the detected location correction unit corrects at least one of the location of the communication device detected by the communication device location detection unit after the overboard fall detection unit detects the falling of the occupant of the watercraft overboard and the location of the watercraft detected by the watercraft location detection unit after the overboard fall detection unit detects the falling of the occupant of the watercraft overboard on the basis of the location difference at the identical location.

4. The watercraft control system according to claim 3,
wherein the watercraft includes
an actuator having a function of generating a propulsive force of the watercraft and a function of generating a turning moment in the watercraft; and
a watercraft control device configured to operate the actuator, and
wherein, after the overboard fall detection unit detects the falling of the occupant of the watercraft overboard,
the detected location correction unit corrects at least one of the location of the communication device detected by the communication device location detection unit and the location of the watercraft detected by the watercraft location detection unit, and
the watercraft control device operates the actuator on the basis of the location of the communication device and the location of the watercraft after a correction process of the detected location correction unit is performed.

5. The watercraft control system according to claim 4, wherein the watercraft control device operates the actuator so that a distance between the location of the communication device and the location of the watercraft after the correction process of the detected location correction unit is performed is less than that when the overboard fall detection unit has detected the falling of the occupant of the watercraft overboard.

6. The watercraft control system according to claim 5,
wherein the watercraft includes a heading detection unit configured to detect heading of the watercraft,
wherein the watercraft control device has an automatic maneuvering mode in which the actuator is operated on the basis of the location of the communication device and the location of the watercraft after the correction process of the detected location correction unit is performed when the overboard fall detection unit has detected the falling of the occupant of the watercraft overboard, and
wherein the watercraft control device executes a control process of decreasing an angle difference between a heading angle of the watercraft and an azimuth angle of the communication device in the watercraft and a control process of decreasing a distance between the location of the communication device and the location of the watercraft
after the correction process of the detected location correction unit is performed in the automatic maneuvering mode.

7. The watercraft control system according to claim 1,
wherein the watercraft includes a disembarkation detection unit configured to detect disembarkation of an occupant of the watercraft,
wherein at least one of the watercraft and the communication device includes a storage unit configured to store a pre-disembarkation communication device location that is a location of the communication device detected by the communication device location detection unit before the disembarkation detection unit detects the disembarkation of the occupant of the watercraft and a pre-disembarkation watercraft location that is a location of the watercraft detected by the watercraft location detection unit before the disembarkation detection unit detects the disembarkation of the occupant of the watercraft, and
wherein the difference calculation unit calculates a difference between the pre-disembarkation communication device location stored in the storage unit and the pre-disembarkation watercraft location stored in the storage unit, as the location difference at the identical location.

8. The watercraft control system according to claim 7, wherein, when the disembarkation detection unit has detected the disembarkation of the occupant of the watercraft,
the detected location correction unit corrects at least one of the location of the communication device detected by the communication device location detection unit after the disembarkation detection unit detects the disembarkation of the occupant of the watercraft and the location of the watercraft detected by the watercraft location detection unit after the disembarkation detection unit detects the disembarkation of the occupant of the watercraft on the basis of the location difference at the identical location.

9. The watercraft control system according to claim 8,
wherein the watercraft includes
an actuator having a function of generating a propulsive force of the watercraft and a function of generating a turning moment in the watercraft; and
a watercraft control device configured to operate the actuator, and
wherein, after the disembarkation detection unit detects the disembarkation of the occupant of the watercraft,
the detected location correction unit corrects at least one of the location of the communication device detected by the communication device location detection unit and the location of the watercraft detected by the watercraft location detection unit, and
the watercraft control device operates the actuator on the basis of the location of the communication device and the location of the watercraft after a correction process of the detected location correction unit is performed.

10. A watercraft control method for use in a watercraft control system including a watercraft and a communication device, the watercraft control method comprising:
  a communication device location detection step of detecting a location of the communication device;
  a watercraft location detection step of detecting a location of the watercraft; and
  a difference calculation step of calculating a difference between the location of the communication device detected in the communication device location detection step and the location of the watercraft detected in the watercraft location detection step as a location difference at an identical location, when a watercraft operator or an occupant is located on the watercraft; and
  a detected location correction step of correcting at least one of the location of the communication device detected in the communication device location detection step and the location of the watercraft detected in the watercraft location detection step on the basis of the location difference at the identical location, when the watercraft and the communication device carried by the watercraft operator or the occupant are away from each other.

11. A non-transitory storage medium storing a program for causing a computer mounted in a watercraft to execute a watercraft location detection step of detecting a location of the watercraft, a reception step of receiving information indicating a location of a communication device, a difference calculation step of calculating a difference between the location of the communication device detected in the communication device location detection step and the location of the watercraft detected in the watercraft location detection step as a location difference at an identical location, when a watercraft operator or an occupant is located on the watercraft; and a detected location correction step of correcting at least one of the location of the communication device detected in the communication device location detection step and the location of the watercraft detected in the watercraft location detection step on the basis of the location difference at the identical location, when the watercraft and the communication device carried by the watercraft operator or the occupant are away from each other,
  wherein the communication device includes
  a communication device location detection unit configured to detect the location of the communication device; and
  a communication unit configured to transmit the information indicating the location of the communication device detected by the communication device location detection unit to the watercraft.

12. A vehicle control system including a vehicle and a communication device,
  wherein the communication device includes
  a communication device location detection unit configured to detect a location of the communication device; and
  a first communication unit,
  wherein the vehicle includes
  a vehicle location detection unit configured to detect a location of the vehicle; and
  a second communication unit, and
  wherein at least one of the vehicle and the communication device includes a difference calculation unit configured to calculate a difference between the location of the communication device detected by the communication device location detection unit and the location of the vehicle detected by the vehicle location detection unit as a location difference at an identical location, when a user is located on the vehicle; and
  a detected location correction unit configured to correct at least one of the location of the communication device detected by the communication device location detection unit and the location of the vehicle detected by the vehicle location detection unit on the basis of the location difference at the identical location, when the vehicle and the communication device carried by the user are away from each other and the location of the vehicle detected by the vehicle location detection unit.

* * * * *